United States Patent
Seo et al.

(10) Patent No.: US 10,708,352 B2
(45) Date of Patent: Jul. 7, 2020

(54) METHOD AND APPARATUS FOR SYNCHRONIZING APPLICATION OF ELECTRONIC DEVICE

(71) Applicant: Samsung Electronics Co., Ltd., Gyeonggi-do (KR)

(72) Inventors: Young-Su Seo, Gyeonggi-do (KR); Joon-Ho Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 599 days.

(21) Appl. No.: 14/817,503

(22) Filed: Aug. 4, 2015

(65) Prior Publication Data

US 2016/0044103 A1 Feb. 11, 2016

(30) Foreign Application Priority Data

Aug. 5, 2014 (KR) .................. 10-2014-0100363

(51) Int. Cl.
| | | |
|---|---|---|
| G08C 17/00 | (2006.01) |
| H04L 12/725 | (2013.01) |
| H04L 5/00 | (2006.01) |
| G06F 15/173 | (2006.01) |
| H04W 52/02 | (2009.01) |
| H04L 29/08 | (2006.01) |
| H04W 4/12 | (2009.01) |

(52) U.S. Cl.
CPC .......... *H04L 67/1095* (2013.01); *H04L 67/32* (2013.01); *H04L 67/325* (2013.01)

(58) Field of Classification Search
CPC .... H04L 67/32; H04L 67/325; H04L 67/1095

USPC ......................................................... 709/201
See application file for complete search history.

(56) References Cited

U.S. PATENT DOCUMENTS

| | | | | |
|---|---|---|---|---|
| 5,654,964 | A * | 8/1997 | Wake .................... | H04J 3/1688 370/395.61 |
| 8,745,185 | B1 * | 6/2014 | Salo ..................... | H04L 63/0428 709/223 |
| 9,015,225 | B2 * | 4/2015 | Paul ..................... | H04L 67/1002 709/203 |
| 9,094,119 | B2 * | 7/2015 | Huen .................. | H04B 10/1129 |
| 9,220,066 | B2 * | 12/2015 | Gerber ................... | H04L 67/26 |
| 9,226,231 | B2 * | 12/2015 | Abraham .......... | H04W 52/0209 |
| 9,335,785 | B2 * | 5/2016 | Mihelič .................... | G06F 1/12 |

(Continued)

FOREIGN PATENT DOCUMENTS

| | | |
|---|---|---|
| WO | 2011/066162 A1 | 6/2011 |
| WO | 2012/071283 A1 | 5/2012 |

*Primary Examiner* — Kevin T Bates
*Assistant Examiner* — Golam Mahmud
(74) *Attorney, Agent, or Firm* — Cha & Reiter, LLC.

(57) ABSTRACT

An apparatus and method for synchronizing applications of an electronic device include identifying, at the electronic device, a first data transmission time corresponding to a first application and a second data transmission time corresponding to a second application. A third data transmission time corresponding to the first application is determined based on the first data transmission time and a fourth data transmission time corresponding to the second application based on the second data transmission time. Data associated with the first application is transmitted from the electronic device at a fifth data transmission time determined based on at least the fourth data transmission time.

19 Claims, 11 Drawing Sheets

(56) References Cited

U.S. PATENT DOCUMENTS

| | | | |
|---|---|---|---|
| 9,774,525 B2* | 9/2017 | Chowdhury | H04L 47/56 |
| 10,009,900 B2* | 6/2018 | Lindoff | H04W 72/1257 |
| 2009/0057559 A1* | 3/2009 | Koyama | G01J 3/02 |
| | | | 250/340 |
| 2009/0207820 A1* | 8/2009 | Dimou | H04L 1/1854 |
| | | | 370/338 |
| 2010/0115048 A1* | 5/2010 | Scahill | H04L 67/322 |
| | | | 709/213 |
| 2012/0159097 A1* | 6/2012 | Jennas, II | G06F 3/0611 |
| | | | 711/162 |
| 2012/0230236 A1 | 9/2012 | Kert et al. | |
| 2013/0055273 A1 | 2/2013 | Hong et al. | |
| 2013/0185373 A1 | 7/2013 | Vandwalle et al. | |
| 2014/0082205 A1* | 3/2014 | Abraham | H04W 8/005 |
| | | | 709/227 |
| 2014/0089933 A1 | 3/2014 | Lioy et al. | |
| 2014/0092083 A1* | 4/2014 | Vanderah | H04W 72/0446 |
| | | | 345/418 |
| 2014/0098778 A1* | 4/2014 | Valentin | H04L 67/32 |
| | | | 370/329 |
| 2014/0280655 A1* | 9/2014 | Garcia | G06Q 50/01 |
| | | | 709/206 |
| 2015/0071370 A1* | 3/2015 | Wilhelmsson | H04L 1/0006 |
| | | | 375/285 |

* cited by examiner

METHOD AND APPARATUS FOR SYNCHRONIZING APPLICATION OF ELECTRONIC DEVICE

CLAIM OF PRIORITY

This application claims priority under 35 U.S.C. § 119(a) from Korean Patent Application Serial number 10-2014-0100363, which was filed on Aug. 5, 2014 in the Korean Intellectual Property Office, the entire disclosure of which is hereby incorporated by reference in its entirety.

BACKGROUND

1. Field of the Disclosure

Various embodiments of the present disclosure relate to a method and apparatus for synchronization in an electronic device.

2. Description of the Related Art

With the development of mobile communication technologies, electronic devices are now capable of various types of data communication functions as well as voice communication. As networks having improved data rates continue to develop, users are provided with a variety of information regardless of time or place. The users check the provided information, generate new information, and provide the generated new information to counterparts.

An electronic device, for example, a mobile device or user equipment like a cellular phone or a tablet Personal Computer (PC), may include various applications. For example, the electronic device may receive in real time a message delivered from a counterpart (for example, a server) connected with a network through an application that provides a service such as an e-mail, a Social Network Service (SNS), Instant Messaging (IM), or the like. Each application may provide a push service for real-time information. The electronic device may transmit a new message associated with the received message to the counterpart.

According to existing technologies, an electronic device needs to periodically communicate with an external device (for example, a server) to be able to deliver in real time data received from various applications (for example, an e-mail application, an SNS application, a messenger application, an IM application, and so forth). For example, there are various applications causing the electronic device to communicate with a server in periods predefined for each application to transmit or receive a message associated with each application. Since a predefined period differs from application to application, communication connections performed by the electronic device and the external device continuously occurs.

For example, there may be an SNS application being accessed by a user and a messenger application being executed by the user's device due to an additional operation. The electronic device needs to maintain communication connection for the SNS application and communication connection for the messenger application to receive a message or messages from the counterpart. Each communication connection occurs in periods which differ from application to application, and may occur with different external devices (e.g. different server causing the electronic device to continuously perform operations for communication connection. As a result, power consumption occurs in the electronic device, hindering efficient use with a limited battery capacity of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure have been made to at least partially solve, alleviate, or remove at least one of problems and/or disadvantages described above and to provide advantages, some of which are described herein below.

Accordingly, various aspects of the present disclosure provide a method and electronic device for obtaining an operating period of the electronic device (for example, a portable terminal) by using information regarding communication connection between the electronic device and another electronic device (for example, a server, proxy server, base station, etc.).

Moreover, various aspects of the present disclosure provide a method and electronic device for synchronizing operating periods for communication connection in the electronic device.

Other objects to be provided in the present disclosure may be understood by embodiments described below.

According to one of the aspects of the present disclosure, there is provided a method including identifying, at an electronic device, a first data transmission time corresponding to a first application and a second data transmission time corresponding to a second application, determining a third data transmission time corresponding to the first application based on the first data transmission time and a fourth data transmission time corresponding to the second application based on the second data transmission time, and transmitting data that is associated with the first application to an outside of the electronic device at a fifth data transmission time determined based on at least the fourth data transmission time.

According to another aspect of the present disclosure, there is provided an electronic device including a communication module configured to communicatively couple the electronic device to an external device, and a synchronization module configured to be implemented with a processor, in which the synchronization module is configured to identify a first data transmission time corresponding to a first application and a second data transmission time corresponding to a second application, to determine a third data transmission time corresponding to the first application based on the first data transmission time and a fourth data transmission time corresponding to the second application based on the second data transmission time, and to transmit data associated with the first application to an outside of the electronic device at a fifth data transmission time determined based on at least the fourth data transmission time through the communication module.

According to one of the aspects of the present disclosure, there is provided a method including identifying a first time-out period for a long polling message delivery system of a first application and a next transmission time of a first request message according to the first time-out period, identifying a second time-out period for a long polling message delivery system of a second application and a next transmission time of a second request message according to the second time-out period, changing the next transmission time of the second request message to the next transmission time of the first request message if a difference between the next transmission time of the second request message and the next transmission time of the first request message is within a predetermined range, and transmitting the first request message and the second request message at the next transmission time of the first request message.

Other aspects, advantages, and salient features of the disclosure will become more apparent to those skilled in the art from the following detailed description, which, taken in conjunction with the annexed drawings, discloses various embodiments of the present disclosure.

Before undertaking the DETAILED DESCRIPTION below, an artisan should understand that certain definitions of certain words and phrases used throughout this patent document are set forth herein below: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software executed by hardware circuitry, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of embodiments of the present disclosure will become more apparent to a person of ordinary skill in the art from the following description taken in conjunction with the accompanying drawings, in which.

Throughout the drawings, like reference numerals will be understood to refer to like parts, components, and structures.

DETAILED DESCRIPTION

Figure 1:
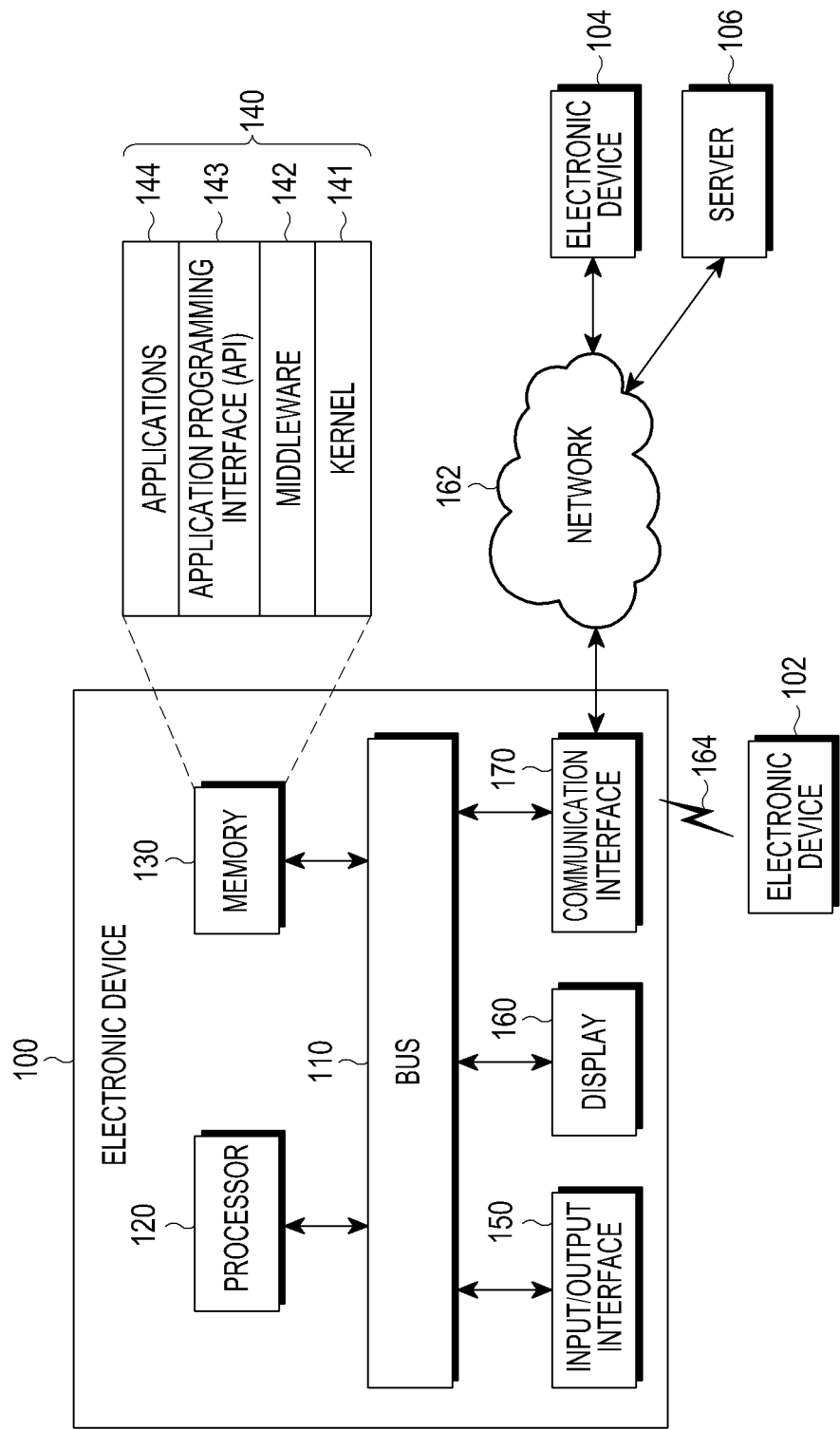
FIG. 1 is a block diagram of a network environment system according to various embodiments of the present disclosure.

Hereinafter, various embodiments of the present disclosure will be disclosed with reference to the accompanying drawings. However, the appended claims are not limited by the present disclosure of particular embodiments herein, and an artisan should construe the disclosure as including various modifications, equivalents, and/or alternatives according to the embodiments of the present disclosure as would be understood by a person of ordinary skill in the art. In regard to the description of the drawings, like reference numerals refer to like elements.

In the present disclosure, an expression such as "having," "may have," "comprising," or "may comprise" indicates existence of a corresponding characteristic (such as an element such as a numerical value, function, operation, or component) and such existence of the corresponding characteristic does not exclude the existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When described herein that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression such as "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situations, an expression "apparatus configured to" may mean that the apparatus "can" operate together with another apparatus or component. For example, the phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure that are used for only describing a specific exemplary embodiment may not limit the scope of other exemplary embodiments. When using in a description of the present disclosure and the appended claims, a singular form may include their plural form unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

An electronic device according to various embodiments of the present disclosure may include at least one of, for example, a smart phone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), an MP3 player, mobile medical equipment, an electronic bracelet, an electronic necklace, an electronic appcessory, a camera, a wearable device (for example, a Head-Mounted Device (HMD)), an electronic cloth, an electronic bracelet, an electronic necklace, an electronic appcessory, an electronic tattoo, a smart mirror, and a smart watch, just to name some non-limiting possibilities.

According to some embodiments, the electronic device may be a smart home appliance. The electronic device may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, and an electronic frame.

According to some embodiments, the electronic device may comprise or may include at least one of various types of medical equipment (for example, various portable medical measurement equipment), such as a blood sugar measurement device, a heartbeat measurement device, a blood pressure measurement device, or a body temperature measurement device, a Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (for example, navigation system and gyro compass for ships), avionics, a security device, a vehicle head unit, an industrial or home robot, an Automatic Teller's Machine (ATM), a Point of Sales (POS), or Internet of things (for example, electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (for example, a water, electricity, gas, or electric wave measuring device). The electronic device according to various embodiments of the present disclosure may be one of the above-listed devices or a combination thereof. The electronic device according to various embodiments of the present disclosure may be a flexible device. A person of ordinary skill in the art will appreciate that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses (operates) the electronic device or a device using the electronic device (for example, an artificial intelligence electronic device).

Referring now to FIG. 1, the electronic device 101 in the network environment 100 according to various embodiments of the present disclosure will be described herein. FIG. 1 is a block diagram of a network environment 100 including an electronic device 101 that may include a bus 110, a processor 120, a non-transitory memory 130, an Input/Output (I/O) interface 150, a display 160, and a communication interface 170. According to some embodiments, the electronic device 101 may omit at least one of the foregoing components or may further include other components.

The bus 110 may include a circuit for interconnecting, for example, the components 120, 130, 150, 160, and 170 and for allowing communication (for example, a control message and/or data) between the components.

The processor 120 may include one or more of a Central Processing Unit (CPU), an Application Processor (AP), and a Communication Processor (CP). The processor 120, which comprises hardware circuitry configured for operation, performs operations or data processing for control and/or communication of, for example, at least one other components of the electronic device 101.

The non-transitory memory 130 may include a volatile and/or nonvolatile memory. The memory 130 may store, for example, commands or data associated with at least one other components of the electronic device 101. According to an embodiment of the present disclosure, the memory 130 may store software and/or a program 140. The program 140 may include, for example, a kernel 141, middleware 142, an Application Programming Interface (API) 143, and/or an application program (or an application) 144. At least some of the kernel 141, the middleware 142, and the API 143 may be referred to as an Operating System (OS).

The kernel 141 controls or manages, for example, system resources (for example, the bus 110, the processor 120, or the memory 130) used to execute an operation or a function implemented in other programs (for example, the middleware 142, the API 143, or the application program 144). The kernel 141 provides an interface through which the middleware 142, the API 143, or the application program 144 accesses separate components of the electronic device 10 to control or manage the system resources.

The middleware 142 may work as an intermediary for allowing, for example, the API 143 or the application program 144 to exchange data in communication with the kernel 141. In regard to task requests received from the application program 144, the middleware 142 performs control (for example, scheduling or load balancing) with respect to the task requests, for example, by giving priorities for using a system resource (for example, the bus 110, the processor 120, or the memory 130) of the electronic device 101 to at least one of the application programs 144.

The API 143 is an interface used for the application program 144 to control a function provided by the kernel 141 or the middleware 142, and may include, for example, at least one interface or function (for example, a command) for file control, window control, image processing or character control.

The I/O interface 150 serves as an interface for delivering a command or data input from a user or another external device to other component(s) of the electronic device 101. The I/O interface 150 may also output a command or data received from other component(s) of the electronic device 101 to a user or another external device.

The display 160 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 160 may display various contents (for example, a text, an image, video, an icon, or a symbol) to users. The display 16 may include a touch screen, and receives a touch, a gesture, proximity, or a hovering input, for example, by using an electronic pen or a part of a body of a user.

The communication interface 170 sets up communication, for example, between the electronic device 101 and an external device (for example, a first external electronic device 102, a second external electronic device 104, or a server 106). For example, the communication interface 170 is connected to a network 162 through wireless or wired communication to communicate with the external device (for example, the second external electronic device 104 or the server 106). For example, the communication interface 170 may communicate with the first external electronic device 102 through direction connection 164 with the first external electronic device 102.

The wireless communication may use, as a cellular communication protocol, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a USB (universal serial bus), a High Definition Multimedia Interface (HDMI), a Recommended Standard (RS)-232, and a Plain Old Telephone Service (POTS).

The network 162 may include, for example, a telecommunications network, for example, at least one of a computer network (for example, a Local Area Network (LAN) or a Wide Area Network (WAN)), Internet, and a telephone network.

Each of the first external electronic device 102 and the second external electronic device 104 may be a device of the same type, as or a different type than the electronic device 101. According to an embodiment of the present disclosure, the server 106 may include a group of one or more servers. According to various embodiments of the present disclosure, some or all of operations performed by the electronic device 101 may be performed in one or more electronic devices (for example, the electronic devices 102 and 104 or the server 106).

Figure 2:
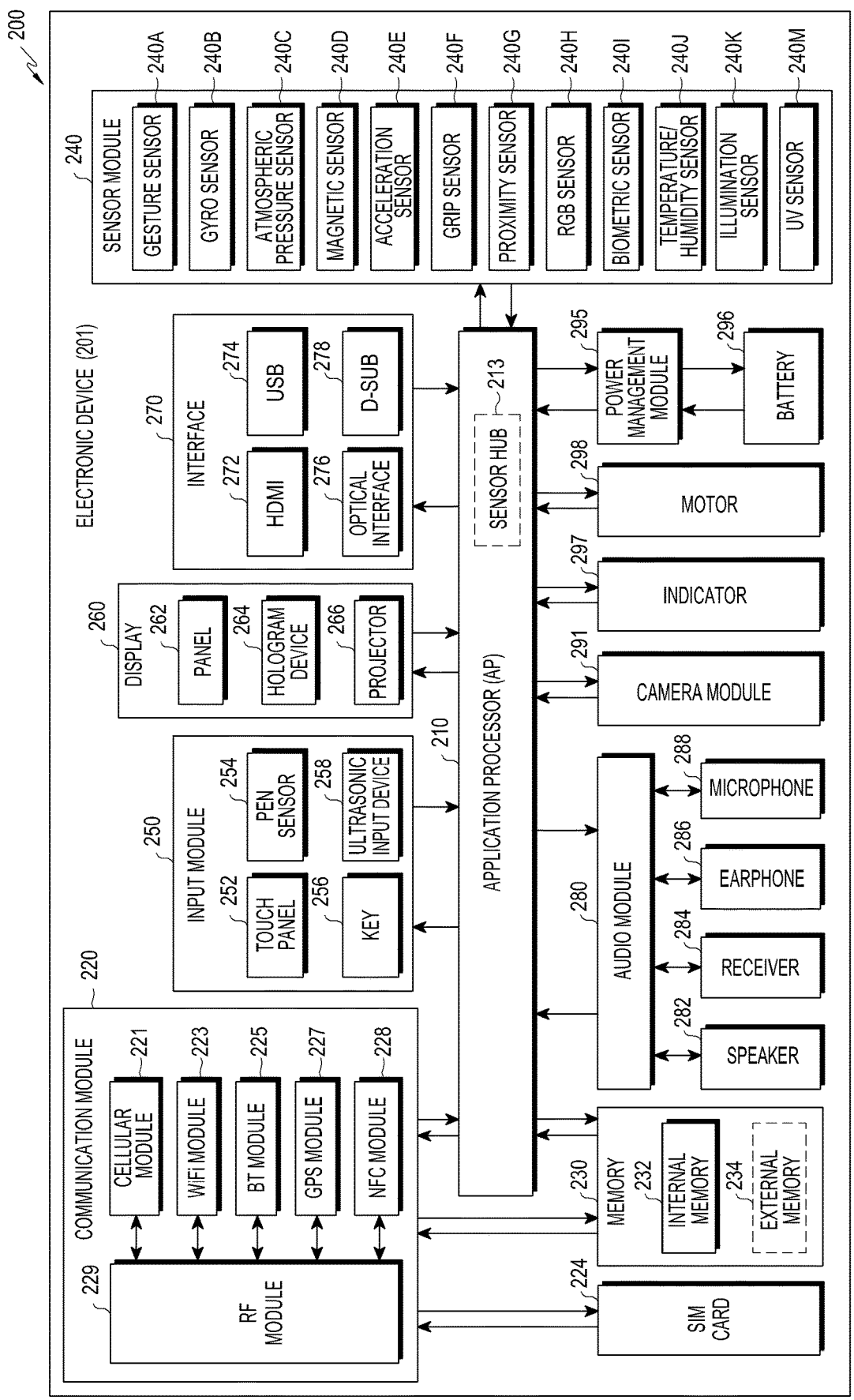
FIG. 2 is a block diagram of an electronic device according to various embodiments of the present disclosure.

FIG. 2 is a block diagram 200 of an electronic device 201 according to various embodiments of the present disclosure. The electronic device 201 may include a whole or a part of, for example, the electronic device 101 illustrated in FIG. 1.

The electronic device 200 may include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 (for example, the processor 120) includes circuitry configured to control multiple hardware or software components connected to the AP 210 or performs various data processing or operations, for example, by driving an OS or an application program. The AP 210 may be implemented, for example, with a System on Chip (SoC). According to an embodiment of the present disclosure, the AP 210 may further include a Graphic Processing Unit (GPU) and/or an Image Signal Processor (ISP). The AP 210 may include at least some (for example, a cellular module 221) of the components illustrated in FIG. 2. The AP 210 loads a command or data received from at least one of other components (for example, a nonvolatile memory) into a volatile memory to process the command or data, and stores various data in the nonvolatile memory.

The communication module 220 may have a configuration that is the same as or similar to that of the communication interface 170 of FIG. 1. The communication module 220 may include, for example, the cellular module 221, a Wireless Fidelity (Wi-Fi) module 223, a Bluetooth (BT) module 225, a Global Positioning System (GPS) module 227, a Near Field Communication (NFC) module 228, and a Radio Frequency (RF) module 229.

The cellular module 221 provides voice communication, video communication, a text service, or an Internet service over a communication network. According to one embodiment of the present disclosure, the cellular module 221 performs identification and authentication with respect to the electronic device 201 in a communication network by using a subscriber identification module (for example, the SIM card 224). According to an embodiment of the present disclosure, the cellular module 221 may perform at least some of functions that may be provided by the AP 210. According to an embodiment of the present disclosure, the cellular module 821 may include a Communication Processor (CP).

Each of the Wi-Fi module 223, the BT module 225, the GPS module 227, and the NFC module 228 may include a processor for processing data transmitted and received therethrough. According to some embodiments, at least some (for example, two or more) of the cellular module 221, the Wi-Fi module 223, the BT module 225, the GPS module 227, and the NFC module 228 may be integrated into a single Integrated Chip (IC) or IC package.

The RF module 229 transmits and receives, for example, a communication signal (for example, an RF signal). The RF module 229 may include, for example, a transceiver, a Power Amp Module (PAM), a frequency filter, a Low Noise Amplifier (LNA), or an antenna. According to another embodiment of the present disclosure, at least one of the cellular module 221, the Wi-Fi module 223, the BT module 225, the GPS module 227, and the NFC module 228 transmits and receives an RF signal through the separate RF module.

The SIM card 224 may include, for example, a card including an SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an embedded memory 232 or an external memory 234. The embedded memory 232 may include, for example, at least one of a volatile memory (for example, a Dynamic Random Access Memory (DRAM) or Synchronous Dynamic RAM (SDRAM), a nonvolatile memory (for example, an One Time Programmable ROM (OTPROM), a Programmable ROM (PROM), an Erasable and Programmable ROM (EPROM), an Electrically Erasable and Programmable ROM (EEPROM), a mask ROM, a flash ROM, or a flash memory (such as a NAND flash or a NOR flash), a hard drive, and a Solid State Drive (SSD).

The external memory 234 may further include a flash drive, for example, a Compact Flash (CF), a Secure Digital (SD), a micro-Secure Digital (SD), a mini-SD, an Extreme Digital (xD), or a memory stick. The external memory 234 may be functionally and/or physically connected with the electronic device 201 through various interfaces.

The sensor module 240 measures a physical amount or senses an operation status of the electronic device 201 to convert the measured or sensed information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red, Green, Blue (RGB) sensor), a biometric sensor 240I, a temperature/humidity sensor 240J, an illumination sensor 240K, and an Ultra Violet (UV) sensor 240M. Additionally or alternatively, the sensor module 240 may further include an E-nose sensor, an Electromyography (EMG) sensor, an ElectroEncephaloGram (EEG) sensor, an ElectroCardioGram (ECG) sensor, an Infrared (IR) sensor, an iris sensor, and/or a fingerprint sensor. The sensor module 840 may further include a control circuit for controlling at least one sensors included therein. In some embodiments, the electronic device 201 may further include a sensor hub 213 or a processor configured to control the sensor module 240 as a part of or separately from the AP 210, to control the sensor module 240 when the AP 210 is in a sleep status.

The input device 250 (for example, the I/O interface 150) may include, for example, a touch panel 252, a (digital) pen sensor 254, a key 256, or an ultrasonic input device 258. The touch panel 252 may use, for example, at least one of a capacitive type, a resistive type, an IR type, and an ultrasonic type. The touch panel 252 may further include a control circuit. The touch panel 252 may further include a tactile layer to provide tactile reaction to a user.

The (digital) pen sensor 254 may be, for example, a part of the touch panel 252 or a separate recognition sheet. The key 256 may include, for example, a physical button, an optical key, or a keypad. The ultrasonic input device 258 may sense audio waves and check data through a microphone (MIC) (for example, a MIC 288) in the electronic device 201 through an input means for generating an ultrasonic signal.

The display 260 (for example, the display 160) may include a panel 262, a hologram device 264, or a projector 266. The panel 262 may have a configuration that is the same as or similar to that of the display 160 of FIG. 1. The panel 262 may be implemented as, for example, being flexible, transparent, or wearable. The panel 262 may be configured as a single module with the touch panel 252. The hologram device 264 shows a cubic image in the air by using interference of light. The projector 266 displays an image by projecting light onto a screen that may be positioned, for example, inside or outside the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (sub) 278. The interface 270 may be included in, for example, the communication interface 160 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) standard interface.

The audio module 280 comprises hardware that interchangeably converts sound and an electric signal. At least some components of the audio module 280 may be included in, for example, the I/O interface 140 illustrated in FIG. 1. The audio module 280 may process sound information that is input or output through the speaker 282, the receiver 284, the earphone 286, or the microphone 288.

The camera module 291 is a device that captures a still image and a moving image, and according to an embodiment of the present disclosure, may include one or more image sensors (for example, a front sensor or a rear sensor), a lens, an ISP, or a flash (for example, an LED or a xenon lamp).

The power management module 295 manages power of the electronic device 201. According to an embodiment of the present disclosure, the power management module 295 may include a Power Management Integrated Circuit (PMIC), a charger IC, or a battery or fuel gauge. The PMIC may use a wired and/or wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included. The battery gauge measures the remaining capacity of the battery 296, and a voltage, a current, or a temperature of the battery 296 during charging. The battery 296 may include, for example, a rechargeable battery and/or a solar battery.

The indicator 297 displays a specific status of the electronic device 201, such as a booting status, a message status, or a charging status, of the electronic device 201 or a part thereof (for example, the AP 210). The motor 298 converts an electric signal into mechanical vibration, and generates vibration or a haptic effect. Although not shown, a processing device (for example, a Graphic Processing Unit (GPU)) for supporting a mobile TV may be included. The processing device for supporting the mobile TV processes media data complying with the standard such as Digital Multimedia Broadcasting (DMB), Digital Video Broadcasting (DVB), or MediaFLO.

Each of the foregoing elements of the electronic device may be configured with one or more components, names of which may vary with a type of the electronic device. In various embodiments of the present disclosure, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
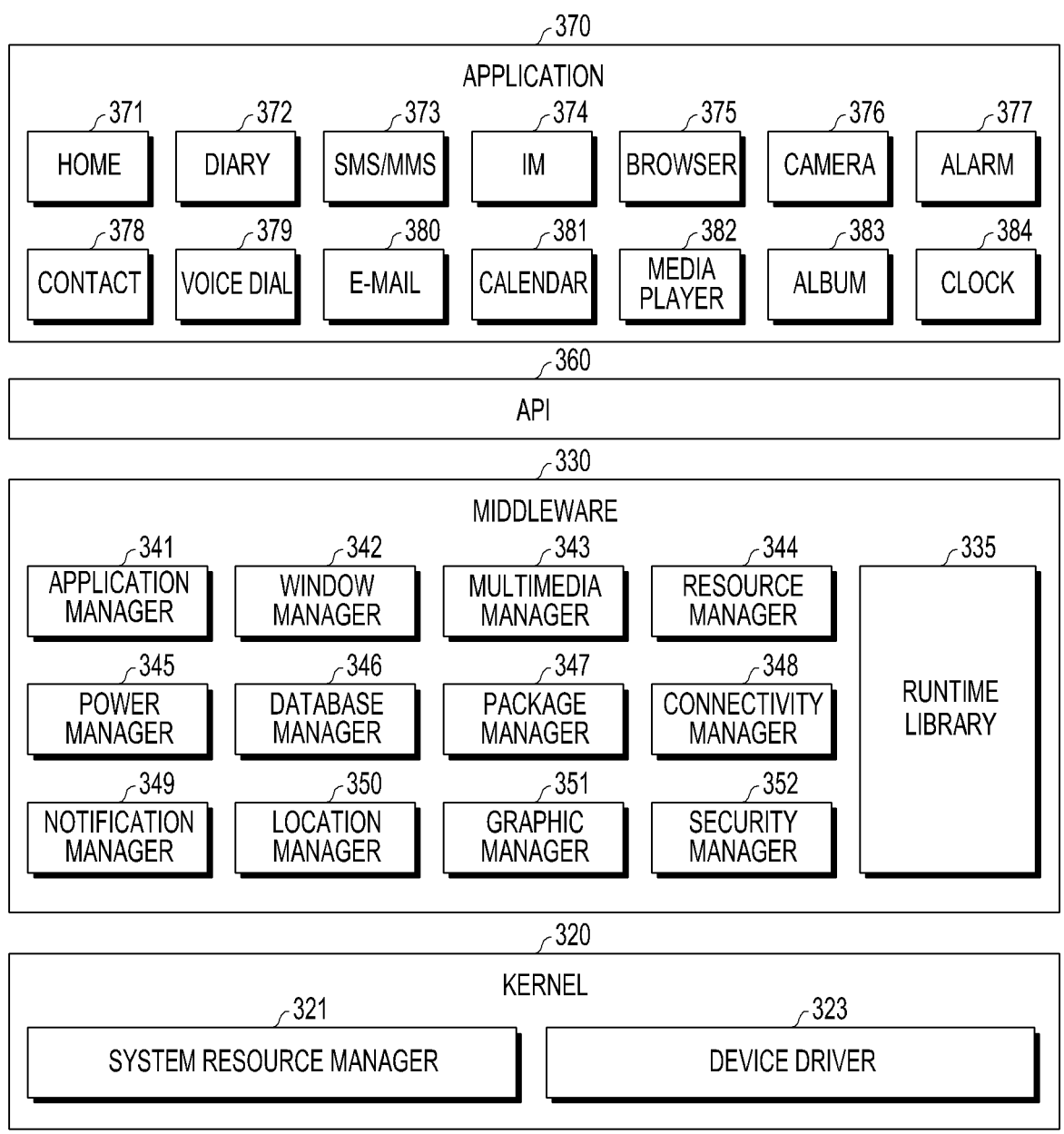
FIG. 3 is a block diagram of a programming module according to various embodiments of the present disclosure.

FIG. 3 is a block diagram 300 of a program module 310 according to various embodiments of the present disclosure. According to an embodiment of the present disclosure, the program module 310 (for example, the program 140) may include an OS for controlling resources related to an electronic device (for example, the electronic device 101) and/or various applications (for example, the application programs 144) driven on the OS. For example, the OS may be Android™, iOS™, Windows™, Symbian™, Tizen™, Bada™, or the like.

The program module 310 may include a kernel 320, middleware 330, an API 360, and/or applications 370. At least a part of the program module 310 may be preloaded on an electronic device or may be downloaded from a server (for example, the server 106).

The kernel 320 (for example, the kernel 141 of FIG. 1) may include a system resource manager 321 and/or a device driver 323. The system resource manager 321 controls, allocates, or collects system resources. The system resource manager 321 may include, for example, a process manager, a memory manager, and a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 provides functions commonly necessary for the applications 370, or provides various functions to the applications 370 through the API 360 such that the applications 370 may efficiently use restricted system resources within the electronic device. According to an embodiment of the present disclosure, the middleware 330 (for example, the middleware 142) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language during execution of one of the applications 370. According to an embodiment of the present disclosure, the runtime library 335 may perform an input/output, memory management, and/or a function for an arithmetic function.

The application manager 341 manages a life cycle of at least one of the applications 370. The window manager 342 manages Graphical User Interface (GUI) resources used by a screen. The multimedia manager 343 detects formats used for reproduction of various media files, and performs encoding and/or decoding of a media file by using a codec suitable for the corresponding format. The resource manager 344 manages resources such as a source code, a memory, and a storage space of at least one of the applications 370.

The power manager 345 manages a battery and/or power, while operating together with a Basic Input/Output System (BIOS), and provides power information used for operation. The database manager 346 manages generation, search, and/or change of a database to be used by at least one of the applications 370. The package manager 347 manages installation and/or an update of an application distributed in a form of a package file.

For example, the connectivity manager 348 manages wireless connectivity such as Wi-Fi or Bluetooth. The notification manager 349 displays and/or notifies an event, such as an arrival message, a promise, a proximity notification, and the like, in such a way not to disturb a user. The location manager 350 manages location information of an electronic device. The graphic manager 351 manages a graphic effect which will be provided to a user, and/or a user interface related to the graphic effect. The security manager 352 provides all security functions used for system security and/or user authentication. According to an embodiment of the present disclosure, when an electronic device (for example, the electronic device 101), has a telephone call function, the middleware 330 may further include a telephony manager (not illustrated) for managing a voice and/or video communication function of the electronic device.

The middleware 330 may include, for example, a middleware module that forms a combination of various functions of the aforementioned components. The middleware 330 provides modules specialized according to types of OSs in order to provide differentiated functions. Further, the middleware 330 dynamically removes some of the existing components and/or adds new components.

The API 360 (for example, the API 143) is a set of API programming functions, and may be provided with a different configuration according to the OS. For example, in a case of Android or iOS, one API set may be provided for each of platforms, and in a case of Tizen, two or more API sets may be provided for each platform.

The applications 370 (for example, the application program 144) may include, for example, a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, and one or more applications capable of providing a function such as health care (for example, measurement of an exercise volume or blood sugar) or providing of environment information (for example, atmospheric pressure, humidity, or temperature information).

According to an embodiment of the present disclosure, the applications 370 may include an application for supporting information exchange between the electronic device (for example, the electronic device 101) and an external electronic device (for example, the electronic device 102 or 104), which will be referred to as an "information exchange application" for convenience. The information exchange application may include, for example, a notification relay application for relaying particular information to the external electronic device or a device management application for managing the external electronic device.

For example, the notification relay application relays notification information generated in the other applications (for example, the SMS/MMS application, the email application, the health care application, or the environment information application) of the electronic device to the external electronic device (for example, the electronic device 102 or 104). The notification relay application receives and provides the notification information from the external electronic device to the user. The device management application manages (for example, installs, deletes, or updates) at least one function (for example, power-on/power-off of the external electronic device (or some components) or display brightness (or resolution) control) of the external electronic device (for example, the electronic device 104) communicating with the electronic device, the application running on the external electronic device, or a service (for example, a call service or a messaging service) provided by the external electronic device.

According to an embodiment of the present disclosure, the applications 370 may include, for example, an application (for example, a health care application) designated based on an attribute (for example, a mobile medical device as a type of the electronic device) of the external electronic device (for example, the electronic device 102 or 104). According to an embodiment of the present disclosure, the applications 370 may include an application received from the external electronic device (for example, the server 106 or the electronic device 102 or 104). According to an embodiment of the present disclosure, the applications 370 may include a preloaded application or a third party application that may be downloaded from a server. The names of the components of the program module 310 according to the illustrated embodiment may vary with a type of an OS.

According to various embodiments of the present disclosure, at least a part of the program module 310 may be implemented by software, firmware, hardware, or a combination of at least two of them. Further, at least a part of the program module 310 may be implemented by, for example, a processor (for example, the AP 210). At least a part of the program module 310 may include, for example, a module, a program, a routine, sets of instructions, and a process for performing one or more functions.

Figure 4:
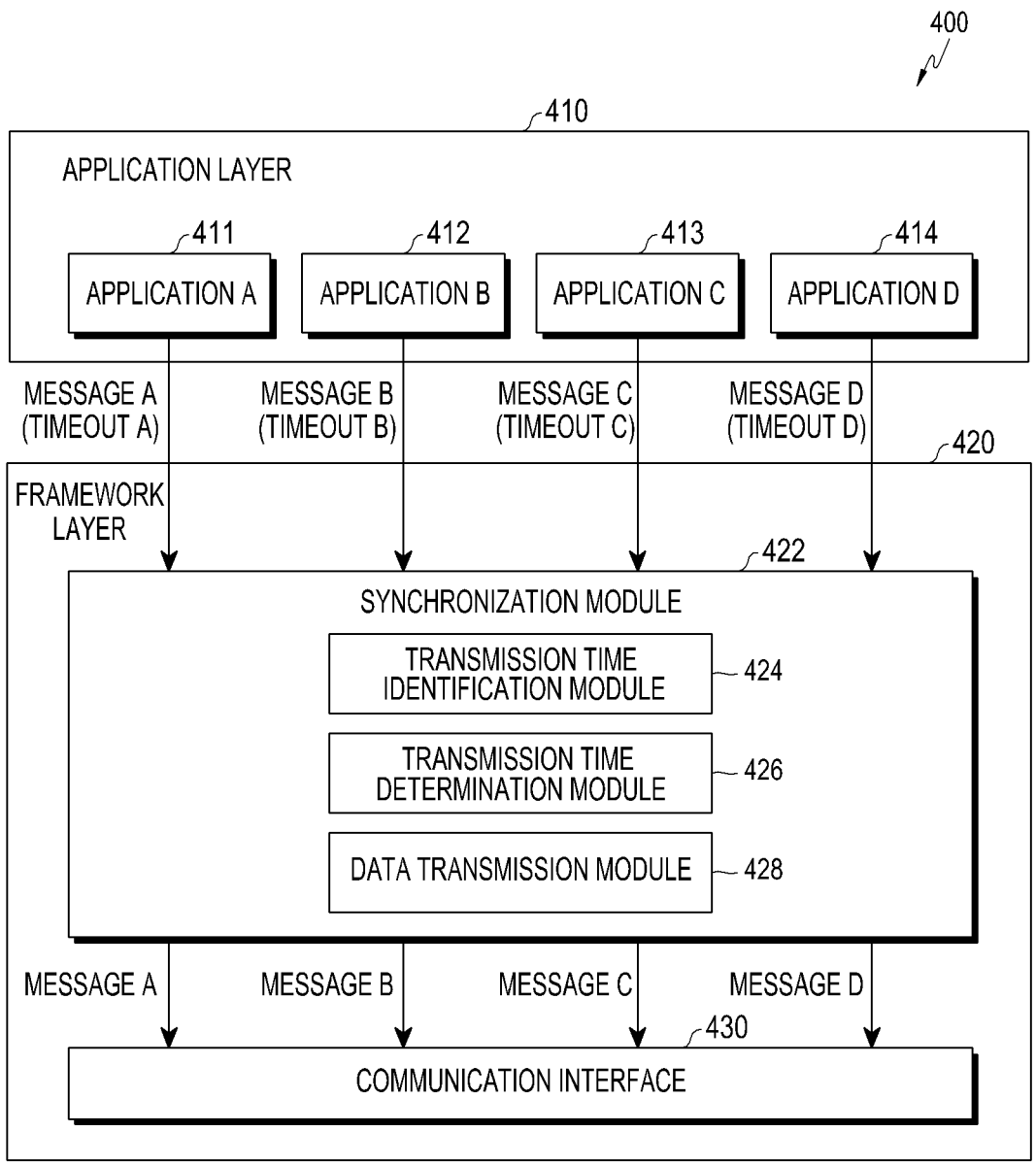
FIG. 4 illustrates exemplary operations of a process for transmitting a message to an external device according to various embodiments of the present disclosure.

FIG. 4 illustrates a process of transmitting a message to an external device according to various embodiments of the present disclosure. Referring to FIG. 4, an electronic device 400 may include an application layer 410 and a framework layer 420. The application layer 410 may include, for example, the application program 144 and/or the API 143 that are shown in FIG. 1. The framework layer 420 may include, for example, the middleware 142 shown in FIG. 1.

According to various embodiments of the present disclosure, the application layer 410 may include a plurality of applications 411 through 414, each of which may have period information (for example, timeout information).

According to various embodiments of the present disclosure, the framework layer 420 may include a synchronization module 422 and a communication interface 430. The communication interface 430 according to the current embodiment may be, for example, the communication interface 170 shown in FIG. 1. The synchronization module 422 may include a transmission time identification module 424, a transmission time determination module 426, and a data transmission module 428.

The transmission time identification module 424 identifies a time when data (for example, a message) has been transmitted from the electronic device to an external device (for example, the electronic device 102, the electronic device 104, or the server 106) through a plurality of applications (for example, the application programs 144). According to an embodiment of the present disclosure, the transmission time identification module 424 identifies a time when the plurality of applications have transmitted data respectively associated with the plurality of applications to the external device based on at least one of internal time information (for example, a system clock or a Real Time Clock (RTC)) of the electronic device or time information obtained from the external device.

The transmission time determination module 426 determines a next data transmission time when an application is to transmit data to the external device based on a data transmission time of the application and information (for example, period information) included in data (for example, a message) delivered from the external device. The next data transmission time may be a time when the application is to transmit the same data as data transmitted at the data transmission time or another associated data or a time when the application is to transmit particular data to the same destination as that to which data is transmitted at the data transmission time or to another associated destination, after the data transmission time. The next data transmission time may be determined differently according to a data transmission time when the application has transmitted data to the external device. According to an embodiment of the present disclosure, the transmission time determination module 426 may determine a time when the electronic device (for example, the electronic device 101) is to transmit or receive data (for example, a message) to/from the external device (for example, the electronic device 102, the electronic device 104, or the server 106). The electronic device may use the information (for example, the data transmission time or period information of the application) identified by the transmission time identification module 424 to determine a time when data is to be delivered to the external device. For example, the transmission time determination module 426 may, using a sum of the time when the application has transmitted data to the external device and the period information associated with the application, determine (or predict) the next data transmission time when the application is to transmit data to the external device.

According to an embodiment of the present disclosure, the transmission time determination module 426 may determine (or predict) a plurality of data transmission times associated with a plurality of applications. The transmission time determination module 426 determines, as next data transmission times of the plurality of applications, at least one of the determined plurality of data transmission times, a time specified by the electronic device (for example, the electronic device 101) or the external device (for example, the electronic device 102, the electronic device 104, or the server 106), and a time derived based on the determined plurality of data transmission times. For example, the transmission time determination module 426 may determine a third data transmission time corresponding to a first application based on a first data transmission time corresponding to the first application. The transmission time determination module 426 may also determine a fourth data transmission time corresponding to a second application based on a second data transmission time corresponding to the second application. The transmission time determination module 426 may determine a next (or fifth) data transmission time when the first application and/or the second application are to transmit data to the external device based on at least one of the third data transmission time, the fourth data transmission time, a time previously specified by the electronic device or the external device, and a time derived from the third data transmission time and/or the fourth data transmission time.

The data transmission module 428 may transmit data (for example, a message) from an electronic device (for example, the electronic device 101) to an external device (for example, the electronic device 102, the electronic device 104, or the server 106) at a fifth data transmission time determined by the transmission time determination module 426 of the electronic device. According to an embodiment of the present disclosure, the data transmission module 428 may adjust at least one of the third data transmission time corresponding to the first application and the fourth data transmission time corresponding to the second application to the fifth data transmission time determined by the transmission time determination module 426, and transmit data corresponding to the first application and/or data corresponding to the second application at the fifth data transmission time. The fifth data transmission time may correspond to a starting point from which the data corresponding to the first application and the data corresponding to the second application are sequentially or simultaneously transmitted.

According to various embodiments of the present disclosure, the synchronization module 422 processes at least a part of information obtained from other elements of the electronic device 400 (for example, the processor 120, the memory 130, the I/O interface 150, or the communication interface 170), and provides the processed information part to a user in various ways. For example, the synchronization module 422 may control at least some functions of the electronic device 400 using or independently of a processor (for example, the processor 120) of the electronic device 400, such that the electronic device 400 interworks with another electronic device (for example, the electronic device 102, the electronic device 104, or the server 106).

According to various embodiments of the present disclosure, the synchronization module 422 may identify period information (for example, timeout A, timeout B, timeout C, and timeout D) from (or associated with) a plurality of applications (for example, an application A 411, an application B 412, an application C 413, and an application D 414) included in the application layer 410. The period information may be identified based on a message transmitted to the outside through the framework layer 420 by the plurality of applications, and may mean a difference between a time when each application has transmitted a message to the outside and a time when each application is to transmit a next message to the outside. Since each application may have a predetermined (or constant) difference, the difference may be determined as period information. The period information may differ from application to application. The period information may be changed based on information generated in the electronic device 400 or received from the outside. The electronic device 400 may identify a time (point in time) when communication with an external device is performed through a message transmitted to the outside based on at least one of the message transmission time identified by the electronic device 400 or the message transmission time received from the outside.

According to various embodiments of the present disclosure, the synchronization module 422 may identify next times (for example, a third transmission time of the application A 411 and a fourth transmission time of the application B 412) when each application is to communicate with an external device, based on the period information (for example, timeout A, timeout B, timeout C, and timeout D) identified from (or associated with) the plurality of applications and times when the plurality of applications communicate with the external device (for example, a first transmission time of the application A 411 and a second transmission time of the application B 412). For example, the synchronization module 422 may identify the third transmission time of the application A 411 by adding the period information (for example, timeout A) of the application A 411 to the first transmission time of the application A 411. The synchronization module 422 may also identify the fourth transmission time of the application B 412 by adding the period information (for example, timeout B) of the application B 412 to the second transmission time of the application B 412.

According to various embodiments of the present disclosure, the synchronization module 422 determines, based on next message transmission times (for example, times when communication with an external device(s) is to be performed) identified using (or based on) messages transmitted by the plurality of applications, a time with which message transmission times of the plurality of applications are to be synchronized. The synchronization time may correspond to a starting point at which the messages of the plurality of applications are transmitted sequentially or simultaneously. The synchronization module 422 may sequentially or simultaneously transmit the messages of the plurality of applications to the outside from/at the synchronization time. As message transmission times respectively associated with the plurality of applications are adjusted to the determined synchronization time, the plurality of applications transmit the messages to the outside, using adjusted information (for example, timeout A', timeout B', timeout C', and timeout D') instead of the period information of the respective applications.

According to various embodiments of the present disclosure, the synchronization time may be determined based on a time previously specified in the electronic device 400. For example, the synchronization time may be determined based on a time interval or a time unit (for example, a period of 30 minutes, 1 time slot, or 2 time slots) predefined in the electronic device or predefined time (for example, 5 minutes past the hour, 30 minutes past the hour, or 01:30 every day). A time slot may indicate a preset transmission time interval or transmission period. The specified time may be preloaded in the electronic device or may be set by a user. The specified time may be changed by applications included in the electronic device, and may be changed by an external device (for example, the electronic device 104 or the server 106).

According to various embodiments of the present disclosure, the communication interface 430 may be, for example, the communication interface 170 shown in FIG. 1. The electronic device 400 performs communication with an external device using the communication interface 430, and transmits messages associated with the plurality of applications to the outside. The communication interface 430 operates based on a transmission time determined by the synchronization module 422. When the communication interface 430 or the electronic device 400 (or the processor) switches from a power-saving mode or an idle mode to an active mode to communicate with the external device. In the idle mode set not to recognize communication with the external device, or by a user's input, or the power-saving mode set to limitedly use only a part of available power of the electronic device, only some elements of the electronic device (for example, an application processor or a communication processor) may consume power. For example, through deactivation of a device (for example, a modem) for communication with the external device (for example, maintenance of the device in the idle state), power consumed in the device for communication with the external device may be reduced. Thus, in comparison to when the electronic device switches to the active mode set to unlimitedly use the available power of the electronic device in the respective periods (or at the respective time intervals) of the plurality of applications, the electronic device may switch to the active mode only at the determined transmission time. In this regard, signaling needed in mode switch and power consumption caused by the signaling may be reduced. For example, about 35 control messages may be needed to switch to a preservation mode and reset a Radio Access Bearer (RAB) in a $3^{rd}$-Generation (3G) Wideband Code Division Multiple Access (WCDMA) system. According to various embodiments of the present disclosure, the electronic device 400 may reduce power necessary for transmission of the control message by using the power-saving mode.

According to various embodiments of the present disclosure, the power-saving mode, the idle mode, or the active mode may be applied to some functions of the electronic device 400 through a dedicated processor associated with the functions. For example, a mode of the dedicated processor associated with communication of the electronic device 400 with the external device may be changed. That is, a microprocessor unit or a modem circuit of the electronic device 400 associated with the communication interface 430 that performs communication may switch from the power-saving mode or the idle mode to the active mode or from the active mode to the power-saving mode or the idle mode. For example, a mode of a processor for displaying various information (for example, multimedia data or text data) to a user may be changed. For example, a graphic processor unit or a display driving circuit associated with the display 160 shown in FIG. 1 may switch from the power-saving mode or the idle mode to the active mode or from the active mode to the power-saving mode or the idle mode.

According to various embodiments of the present disclosure, the synchronization module 422 determines a time to transmit a message to the outside based on an inactive duration of a device (for example, a modem) associated with the communication interface 430 of the electronic device 400. The inactive duration may include a duration in which the electronic device 400 is maintained in the idle state or in a low-power mode. The deactivation may include deactivation of the processor 120 shown in FIG. 1. The processor 120 may include one or more Application Processors (APs) or one or more Communication Processors (CPs). For example, based on an inactive duration (for example, a catnap duration) specified in a device (for example, a modem or the communication interface 170) performing communication with the external device, the electronic device determines a time to transmit messages associated with the plurality of applications in a duration other than the inactive or catnap duration. In this way, by preventing the device performing communication with the external device from being activated by the plurality of applications in the inactive or catnap duration, inefficient use of power may be prevented. With reference to FIGS. 5 through 10, additional information about the synchronization module 422 will be provided.

Figure 5A:
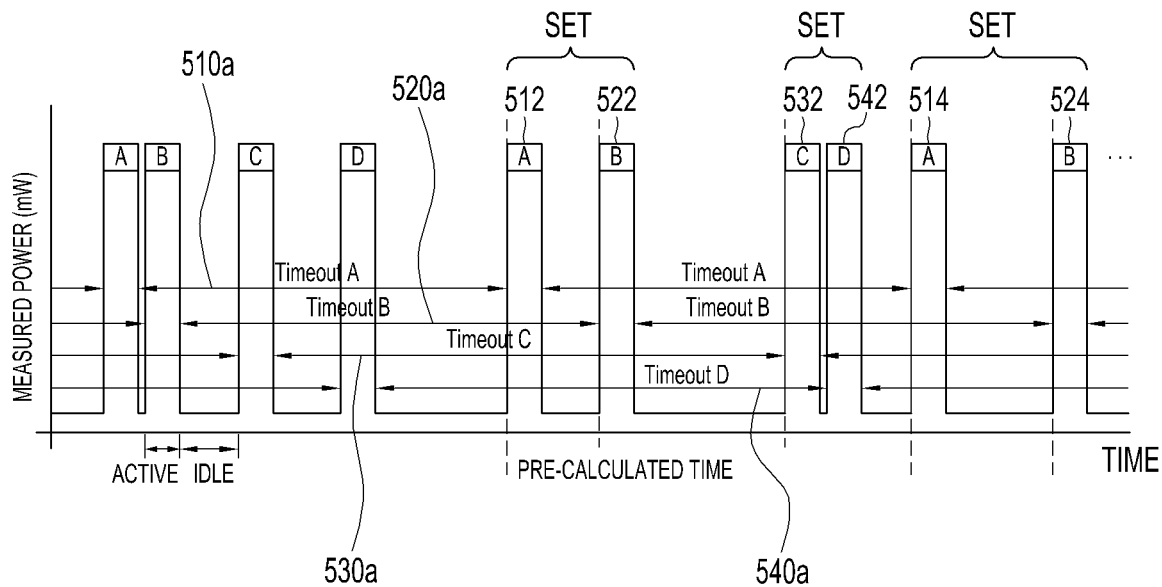
FIG. 5A, FIG. 5B, FIG. 5C, FIG. 6A, FIG. 6B, FIG. 6C and FIG. 6D illustrate an operation of synchronizing a message to be transmitted to an external device and power consumption for the operation according to various embodiments of the present disclosure.
Figure 5B:
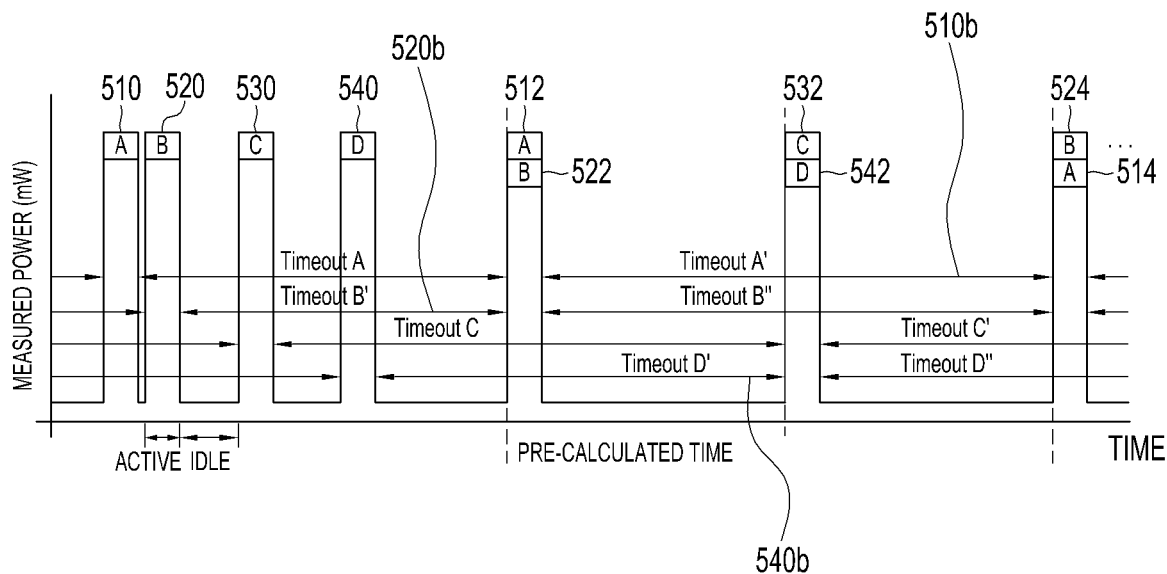
Figure 5C:
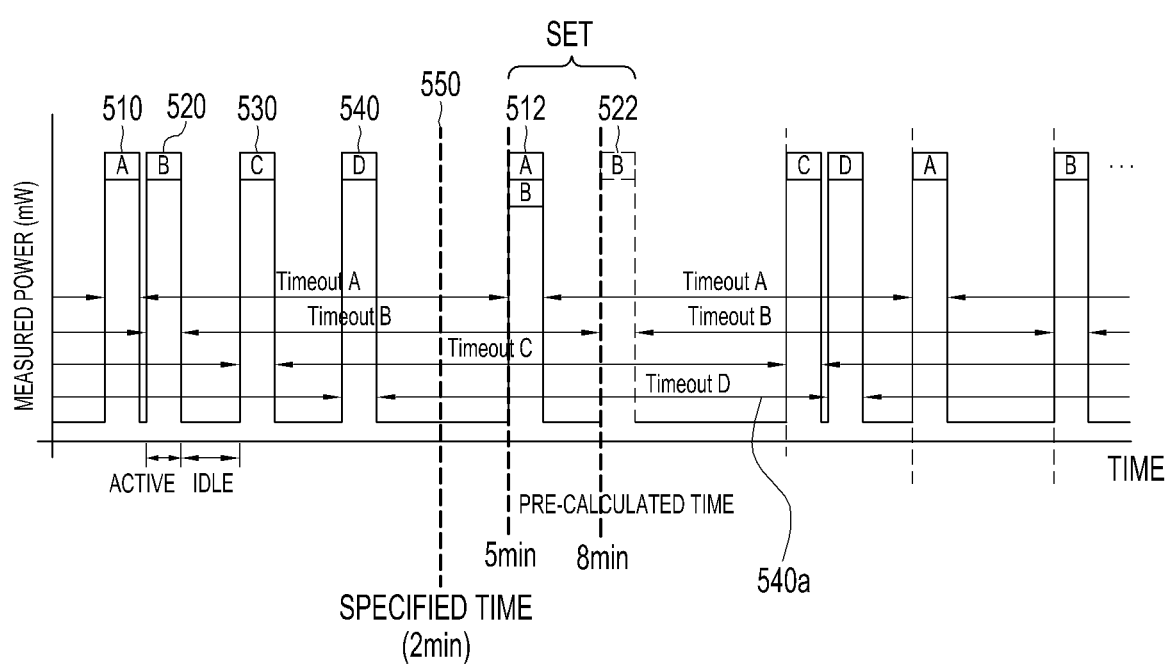

FIGS. 5A, 5B and 5C illustrate power consumption generated in an electronic device during synchronization of message transmission times based on respective period information of applications transmitting messages. In a process of periodically transmitting messages by a plurality of applications A, B, C, and D to an external device, an electronic device according to the current embodiment calculates next transmission times (for example, 512, 522, 532, and 542) respectively corresponding to the applications A, B, C, and D based on period information (for example, 510a, 520a, 530a, and 540a) of the applications A, B, C, and D and synchronizes the calculated transmission times with at least one transmission time, reducing power consumption caused by message transmission.

According to an embodiment of the present disclosure, the electronic device executes a plurality of applications transmitting messages to an external device, for example, the applications A, B, C, and D. As the applications A, B, C, and D are executed, message transmission may be performed at a particular time and thus a predetermined amount of power required for message transmission may be consumed. For example, each application is set to periodically transmit a message associated therewith to an external device, a processor (for example, the processor 120) or a dedicated processor associated with a function of communication with the external device switches to an active mode at a time interval or in a period associated with message transmission, such that the electronic device performs message transmission using power required for message transmission. According to an embodiment of the present disclosure, in times other than the time interval or the period associated with message transmission, the processor or the dedicated processor associated with the function of communication with the external device switches to the power-saving mode or the idle mode, and thus consumes lower power than power consumed in the active mode or does not perform at least some functions (or all functions) consuming power.

Referring to FIG. 5A, communication with the external device may be performed at the next transmission times (for example, 512, 522, 532, and 542) determined based on the period information (for example, 510a, 520a, 530a, and 540a) associated with the applications A through D, such that a predetermined amount of power may be consumed at the transmission times 512, 522, 532, and 542. After the transmission time 512, communication associated with the application A may be performed at the transmission time 514 determined based on the period information 510a associated with the application A, and after the transmission time 522, communication associated with the application B may be performed at the transmission time 524 determined based on the period information 520a associated with the application B, thus a predetermined amount of power may be consumed at the corresponding transmission times 514 and 524. The power consumed at each of the transmission times 512 and 514 corresponding to the application A, the power consumed at each of the transmission times 522 and 524 corresponding to the application B, the power consumed at the transmission time 532 corresponding to the application C, and the power consumed at the transmission time 542 corresponding to the application D may be equal to one another as shown in FIG. 5A, or may be different from one another. In the current embodiment, a relative amount of power consumed at each transmission time is not limited.

According to various embodiments of the present disclosure, the electronic device groups transmission times of respective applications into at least one set to synchronize the transmission times include in the same set with one another. For example, the electronic device may group the transmission time 512 and the transmission time 522 from among the transmission times (for example, 512, 522, 532, and 542) determined based on the period information into one set and the transmission time 532 and the transmission time 542 into another set. The electronic device may also group the transmission time 514 and the transmission time 524 into a new set. In this case, the electronic device synchronizes the transmission time 512 and the transmission time 522 with one transmission time, the transmission time 532 and the transmission time 542 with another transmission time, and the transmission time 514 and the transmission time 524 with another transmission time.

According to various embodiments of the present disclosure, the electronic device may determine a set including corresponding transmission times based on a difference or interval between transmission times (for example, 512, 522, 532, and 542) determined based on period information. For example, the electronic device compares a difference between the transmission time 512 and the transmission time 522 with a difference between the transmission time 512 and the transmission time 532, such that if the difference between the transmission time 512 and the transmission time 522 is less than the difference between the transmission time 512 and the transmission time 532, the electronic device may determine the transmission time 512 and the transmission time 522 as one set. In the same manner, if a difference between the transmission time 532 and the transmission time 542 is less than a difference between the transmission time 532 and the transmission time 522, the electronic device may determine the transmission time 532 and the transmission time 542 as one set. Additionally, the electronic device may determine the transmission time 514 and the transmission time 524 as one set.

According to various embodiments of the present disclosure, the electronic device may determine or dynamically change a transmission time corresponding to each application based on not only period information of the application but information included in an event occurring in association with the transmission time, for example, a response message to a message transmitted at the transmission time. For example, the transmission time 514 of the application A may be determined to be a time between the transmission time 542 and the transmission time 524 as shown in FIG. 5A based on the previous transmission time 512 and the period information 510a of the application A, but if a response message to a message transmitted at the previous transmission time 512 is received, the transmission time 514 of the application A may be changed to a time preceding the transmission time 532. In this case, according to the change, the transmission time 514 determined as one set with the transmission time 524 may move to a set including the transmission time 532 and the transmission time 542.

Referring to FIG. 5B, the electronic device may synchronize the transmission time 512 corresponding to the application A and the transmission time 522 corresponding to the application B with one (for example, 512) of the transmission times 512 and 522 and the transmission time 532 corresponding to the application C and the transmission time 542 corresponding to the application D with one (for example, 532) of the transmission times 532 and 542. Thus, a predetermined amount of power may be consumed at each of the synchronization times 512 and 532. The power consumed at the synchronization time 512 of the application A and the application B may be equal to or different from the power consumed in at least one of the transmission time 510 of the application A and the transmission time 520 of the application B. Likewise, the power consumed at the synchronization time 532 of the application C and the application D may be equal to or different from the power consumed in at least one of the transmission time 530 of the application C and the transmission time 540 of the application D. In the current embodiment, a relative amount of power consumed at each synchronization time is not limited.

According to various embodiments of the present disclosure, as synchronization is performed, a time interval or a period of an application associated with a transmission time adjusted by the synchronization also changes dynamically. For example, as the transmission time 522 and the transmission time 542 are synchronized (adjusted) with the transmission time 512 and the transmission time 532, respectively, unlike in FIG. 5A, period information associated with the application B corresponding to the adjusted transmission time 512 and period information associated with the application D corresponding to the adjusted transmission time 532 may be temporarily changed. The period information 520a of the application B shown in FIG. 5A may be changed into new period information 520b based on a change in the transmission time 522. The period information 540a of the application D shown in FIG. 5A may be changed into new period information 540b based on a change in the transmission time 542. The changed period information may be fixed, or may be changed depending on a context of the electronic device.

According to various embodiments of the present disclosure, the context of the electronic device may include, for example, at least one of an external input (a user input or information received from an external device), a duration of deactivation of communication connection between the electronic device and the external device, the amount of power consumed at the electronic device, and the remaining amount of power associated with the electronic device. The context of the electronic device may be determined, for example, in the synchronization module 422 of FIG. 4.

According to various embodiments of the present disclosure, the electronic device determines an additional synchronization time based on a synchronization time. For example, the transmission time 514 and the transmission time 524 may be grouped into one set and synchronized with each other, and an additional synchronization time may be determined based on comparison between each of the transmission time 514 and the transmission time 524 and the previous synchronization time 532. The electronic device compares a difference between the previous synchronization time 532 and the transmission time 514 with a difference between the previous synchronization time 532 and the transmission time 524. If the difference between the previous synchronization time 532 and the transmission time 514 is less than the difference between the previous synchronization time 532 and the transmission time 524, the transmission time 514 and the transmission time 524 may be synchronized with the transmission time 524. This is because it may be more efficient to consume power at the transmission time 524 that is farther from the previous synchronization time 532 than to consume power at the transmission time 514 that is closer to the previous synchronization time 532. The determination of the synchronization time may be performed depending on the context of the electronic device by the synchronization module (for example, the synchronization module 422 of FIG. 4).

Referring now to FIG. 5C, the electronic device may synchronize transmission times based on a difference or interval between each of the transmission times and the current time. For example, the electronic device may synchronize the transmission time 512 corresponding to the application A and the transmission time 522 corresponding to the application B with one time (for example, 512) that is closest to the current time (for example, 00:02) from among the transmission times 512 (for example, 00:05) and 522 (for example, 00:08). However, this is merely an embodiment, and unlike in FIG. 5C, transmission times may also be synchronized with the transmission time father from the current time.

Figure 6A:
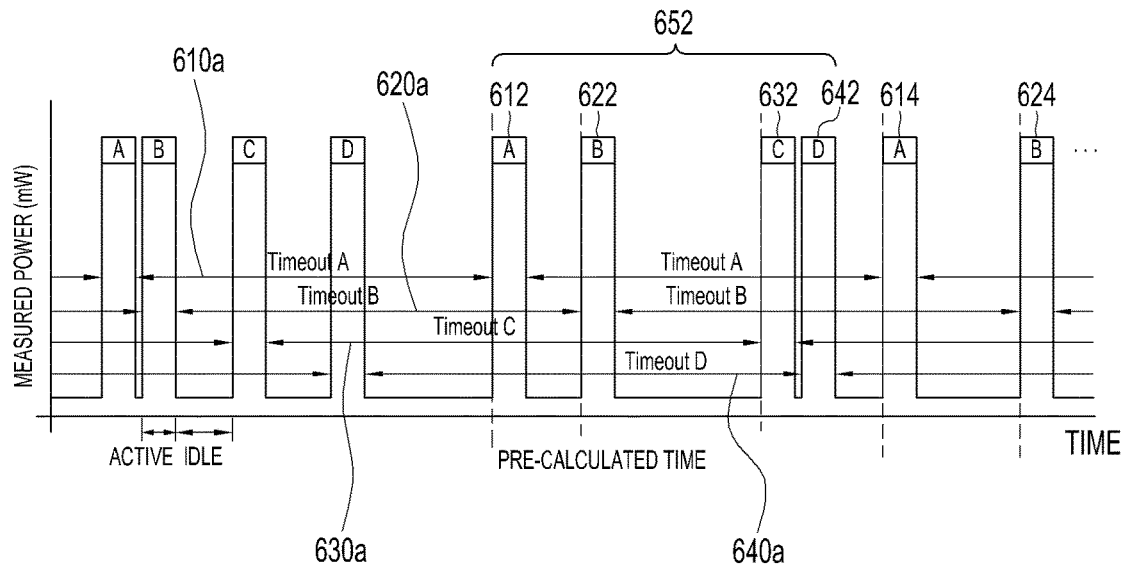

Referring to FIG. 6A, communication with an external device may be performed at next transmission times (for example, 612, 622, 632, and 642) determined based on period information (for example, 610a, 620a, 630a, and 640a) associated with the applications A through D, such that a predetermined amount of power may be consumed at each of the transmission times 612, 622, 632, and 642. Communication associated with the application A may be performed at a transmission time 614 determined based on the period information 610a associated with the application A after the transmission time 612, and communication associated with the application B may be performed at a transmission time 624 determined based on the period information 620a associated with the application B, such that a predetermined amount of power may be consumed at each of the transmission times 614 and 624. Power consumed at each of the transmission times 612 and 614 corresponding to the application A, power consumed at the transmission times 622 and 624 corresponding to the application B, power consumed at the transmission time 632 corresponding to the application C, and power consumed at the transmission time 642 corresponding to the application D may be equal to as shown in FIG. 6A or may be different from one another. In the current embodiment, a relative amount of power consumed at each transmission time is not limited.

According to various embodiments of the present disclosure, the electronic device groups the transmission times 612, 622, 632, and 642 into one set to synchronize them based on specified time information. In this case, the electronic device may synchronize the transmission times 612, 622, 632, and 642 included in one set with one particular time. The particular time may be determined based on previously specified time information. For example, if the particular time determined based on the previously specified time information is included in a temporal range 652 including the transmission times 612, 622, 632, and 642 included in the set, the particular time may be determined as a synchronization time associated with the set.

Figure 6B:
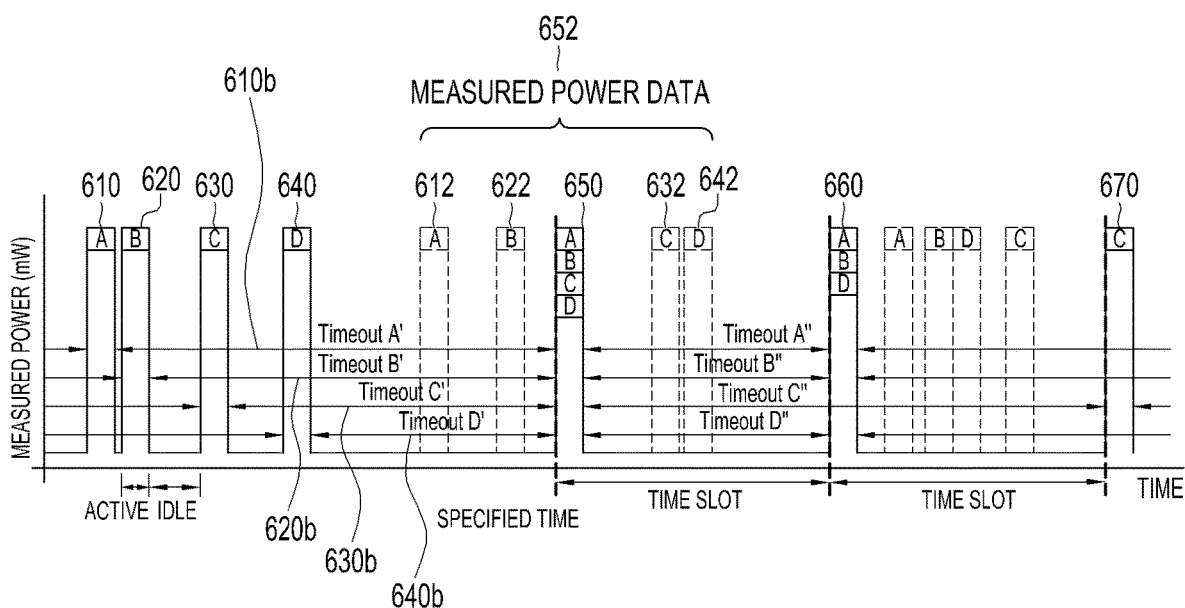

Referring to FIG. 6B, the electronic device synchronizes the transmission time 612 corresponding to the application A, the transmission time 622 corresponding to the application B, the transmission time 632 corresponding to the application C, and the transmission time 642 corresponding to the application D with a specified time 650. Messages associated with the applications A through D are sequentially or simultaneously transmitted at the synchronization time 650, such that a predetermined amount of power is consumed. The power consumed at the synchronization time 650 of the applications A through D may be equal to or different from the power consumed in at least one of the transmission time 610 of the application A, the transmission time 620 of the application B, the transmission time 630 of the application C, and the transmission time 640 of the application D. In the current embodiment, a relative amount of power consumed at each synchronization time is not limited.

According to various embodiments of the present disclosure, the electronic device may change a time interval or a period of an application associated with a transmission time adjusted by synchronization with a specified time. For example, as the transmission times 612, 622, 632, and 642 are adjusted to the specified time 650 by synchronization, period information associated with each of the applications A through D corresponding to the specified time 650 may be changed temporarily. The period information 610*a* of the application A of FIG. 6A may be changed into the new period information 610*b* based on adjustment of the transmission time 612. The period information 620*a* of the application B of FIG. 6A may be changed into new period information 620*b* based on adjustment of the transmission time 622. The period information 630*a* of the application C of FIG. 6A may be changed into new period information 630*b* based on adjustment of the transmission time 632. The period information 640*a* of the application D of FIG. 6A may be changed into new period information 640*b* based on a change in the transmission time 642. The changed period information may be fixed, or may be changed depending on the context of the electronic device.

According to various embodiments of the present disclosure, the messages associated with the applications A through D may be sequentially or simultaneously transmitted to the outside at a time specified in the electronic device. For example, the specified time 650 may be set to be included in a temporal range including the times 612, 622, 632, and 642 determined based on period information of the respective applications. If a synchronization time for communication with the external device is determined to be the specified time 650, each of next times (for example, 612, 622, 632, and 642) for communication with the external device may be adjusted to the specified time 650 at which the messages associated with the applications A through D may be transmitted to the outside.

According to various embodiments of the present disclosure, the electronic device may determine an additional synchronization time based on the synchronization time. For example, the additional synchronization time may be determined based on the synchronization time 650 and a time slot that is set in association with message transmission in the electronic device. For example, the next synchronization time may be a time 660 or 670 after the time slot from the previous synchronization time 650. The time slot may be previously set in the electronic device or may be changed by a user's input.

Figure 6C:
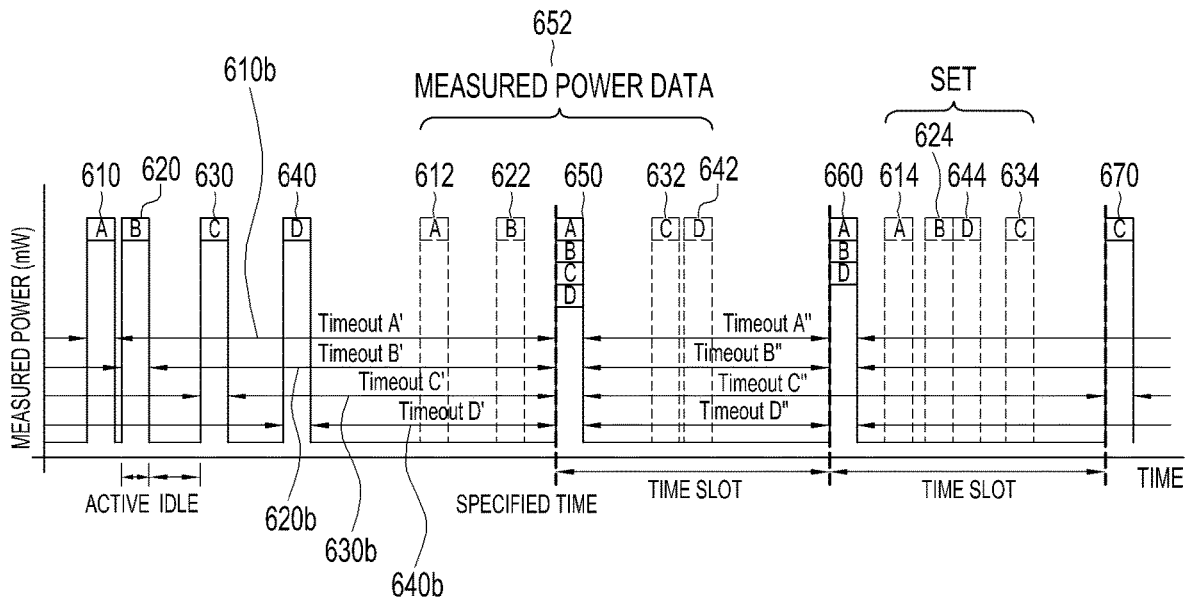

Referring now to FIG. 6C, the electronic device synchronizes the next transmission time 614 corresponding to the application A, the next transmission time 624 corresponding to the application B, and the next transmission time 644 corresponding to the application D with a second time 660 after a previously set time slot (for example, 1 minute) from the previous synchronization time, that is, the first time 650, and synchronizes the next transmission time 634 corresponding to the application C with a third time 670 after the double (for example, 2 minutes) of the previously set time slot from the first time 650. The power consumed at the second time 660 which is the synchronization time of the application A, the application B, and the application D may be equal to or different from the power consumed in at least one of the transmission time 610 of the application A, the transmission time 620 of the application B, and the transmission time 640 of the application D. The power consumed at the third time 670 that is the synchronization time of the next transmission time 634 of the application C may be equal to or different from the power consumed at the transmission time 630 of the application C. In the current embodiment, a relative amount of power consumed at the synchronization time is not limited.

According to various embodiments of the present disclosure, the electronic device may dynamically change a time slot based on a user's input. For example, if the time slot is changed by a user (for example, 5 minutes) unlike a previously set time slot (for example, 1 minute), the second time 660 may be determined to be a time after a previously set time slot (for example, 1 minute) from the specified first time 650, and the third time 670 may be determined to be a time after a time slot (for example, 5 minutes) changed by the user from the second time 660. After the time slot is changed by the user, an expected interval between synchronization times may be maintained as the time slot (for example, 5 minutes) changed by the user.

According to various embodiments of the present disclosure, the electronic device may additionally determine times (for example, 614, 624, 634, and 644) communicating with the external device. The electronic device may determine times to transmit the messages associated with the applications A through D to the outside by comparing differences between the additionally determined times (for example, 614, 624, 634, and 644) to communicate with the external device and the synchronization times (for example, 660 and 670) after a time slot(s) from the specified time 650. For example, the electronic device may compare a difference between the time 660 and the time 614 with a difference between the time 670 and the time 614. If the difference between the time 660 and the time 614 is less than the difference between the time 670 and the time 614, the electronic device adjusts the time 614 to the time 660 and transmits a message associated with the application A at the time 660. The electronic device may compare a difference between the time 660 and the time 624 with a difference between the time 670 and the time 624. If the difference between the time 660 and the time 624 is less than the difference between the time 670 and the time 624, the electronic device adjusts the time 624 to the time 660 and transmits a message associated with the application B at the time 660. The electronic device may adjust the time 644 in the foregoing manner and transmit a message associated with the application D. The electronic device may compare a difference between the time 660 and the time 634 with a difference between the time 670 and the time 634, and since the difference between the time 660 and the time 634 is greater than the difference between the time 670 and the time 634, the electronic device may adjust the time 634 to the time 670 and transmit the message associated with the application C.

Figure 6D:
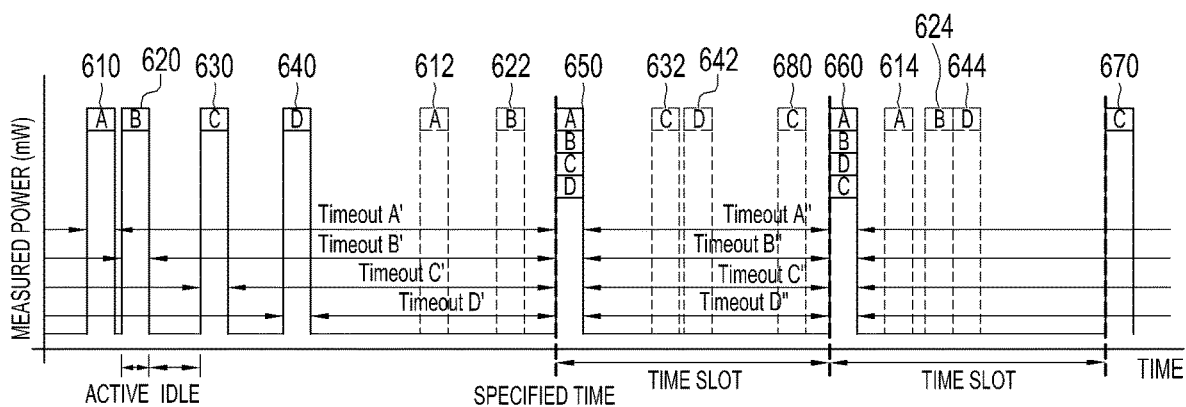

Referring now to FIG. 6D, after the messages associated with the applications A through D are transmitted to the outside at the synchronization time 650, a response message to the transmitted message may be received from the external device. The electronic device may receive a response message in response to a message for the application C transmitted at the synchronization time 650. The electronic device may transmit a request message associated with the application C in response to the received response message at the time 680.

According to various embodiments of the present disclosure, the electronic device synchronizes the next transmission time 614 corresponding to the application A, the next transmission time 624 corresponding to the application B, the next transmission time 644 corresponding to the application D, and the request message transmission time 680 associated with the application C with the second time 660 after a previously set time slot (for example, 1 minute) from the previous synchronization time, the first time 650. The power consumed at the second time 660, which is the synchronization time of the applications A through D, may be equal to or different from the power consumed in at least one of the transmission time 610 corresponding to the application A, the transmission time 620 corresponding to the application B, the transmission time 640 corresponding to the application d, and the request message transmission time 680 associated with the application C. In the current embodiment, a relative amount of power consumed at the synchronization time is not limited.

According to various embodiments of the present disclosure, after the messages associated with the applications A, B, C and D are transmitted to any of the external devices (e.g. electronic device 102 or 104, server 106), the next transmission times (for example, 614, 624, 634, and 644) corresponding to the applications A, B, C and D may be changed based on a response message to a message transmitted from an external device. For example, if receiving a response message to the message corresponding to the application C transmitted to the external device at the time 650, the electronic device transmits a message to be transmitted at the next transmission time 634 corresponding to the application C at the request message transmission time 680. The electronic device may skip transmitting the message associated with the application C to the external device at the transmission time 634.

According to various embodiments of the present disclosure, the electronic device may determine a synchronization time based on a request message in response to a response message transmitted from an external device. For example, if there is a request message in response to the response message transmitted from the external device, the electronic device compares differences between the changed next transmission times (for example, 614, 624, 644, and 680) respectively corresponding to the applications A through D and the synchronization times (for example, 660 and 670) after a time slot(s) from the specified time 650 to determine a time to transmit the messages associated with the applications A through D to the outside. For example, the electronic device may compare a difference between the time 660 and the time 614 with a difference between the time 670 and the time 614. If the difference between the time 660 and the time 614 is less than the difference between the time 670 and the time 614, the electronic device may adjust the time 614 to the time 660 and transmit the message associated with the application A at the time 660. The electronic device may also compare a difference between the time 660 and the time 624 with a difference between the time 670 and the time 624. If the difference between the time 660 and the time 624 is less than the difference between the time 670 and the time 624, the electronic device may adjust the time 644 in the foregoing manner and transmit the message associated with the application BD at the adjusted time. If receiving a response message associated with the application C, unlike in FIG. 6C, the electronic device may compare a difference between the time 660 and the request message transmission time 680 with a difference between the time 670 and the request message transmission time 680. Since the difference between the time 660 and the request message transmission time 680 is less than the difference between the time 670 and the request message transmission time 680, the electronic device may adjust the request message transmission time 680 to the time 660 and transmits the message associated with the application C at the time 660. Other embodiments are also possible.

According to various embodiments of the present disclosure, the external device may be a device associated with each application included in the electronic device 101 over the network 162 (for example, the Internet), and may include a device for delivering messages between the electronic device 101 and the external electronic device 104, the server 106, or the external electronic device 102 or 104. The external device may store information for interworking with the electronic device 101 (for example, period information of an application). The external device may be, for example, a mail server, an SNS server, or an IM server.

According to various embodiments of the present disclosure, electronic device includes a communication module configured to connect the electronic device with an external device and a synchronization module configured to be implemented with a processor, in which the synchronization module is configured to identify a first data transmission time corresponding to a first application and a second data transmission time corresponding to a second application, determine a third data transmission time corresponding to the first application based on the first data transmission time and a fourth data transmission time corresponding to the second application based on the second data transmission time, and transmit data associated with the first application to an outside of the electronic device at a fifth data transmission time determined based on at least the fourth data transmission time through the communication module.

According to various embodiments of the present disclosure, the third data transmission time is determined further based on a first data transmission period (or a first data transmission interval) corresponding to the first application, and the fourth data transmission time is determined further based on a second data transmission period (or a second data transmission interval) corresponding to the second application.

According to various embodiments of the present disclosure, the synchronization module determines the fifth data transmission time based on a time previously specified in the electronic device.

According to various embodiments of the present disclosure, the synchronization module is configured to set, as the specified time, a time that is included in a specified range including the third data transmission time and the fourth data transmission time and is different from the third data transmission time or the fourth data transmission time.

According to various embodiments of the present disclosure, the synchronization module is configured to select the fifth data transmission time from a duration other than a duration in which communication connection between the electronic device and the external device is deactivated.

According to various embodiments of the present disclosure, the synchronization module is configured to set, as the fifth data transmission time, at least one of one of the third data transmission time and the fourth data transmission time, which has the smallest difference with a specific data transmission time (or a synchronization time), and one of the third data transmission time and the fourth data transmission time, which is closest to a current time.

According to various embodiments of the present disclosure, the synchronization module is configured to determine the fifth data transmission time further based on at least one of an amount of power consumption associated with the first application or the second application and a remaining amount of power associated with the electronic device.

According to various embodiments of the present disclosure, the synchronization module is configured to derive the fifth data transmission time based on at least one of the third data transmission time, the fourth data transmission time, and a previously specified time and to change at least one of the third data transmission time and the fourth data transmission time to the fifth data transmission time.

According to various embodiments of the present disclosure, the synchronization module is configured to calculate a next (or sixth) data transmission time corresponding to a third application if data transmission is recognized in the third application, and to change the fifth data transmission time further based on the next (or sixth) data transmission time.

According to various embodiments of the present disclosure, the synchronization module is configured to determine the fifth data transmission time based on at least one of a first interval value calculated by summing a difference between the current time and the third data transmission time and a difference between the current time and the fourth data transmission time and a second interval value calculated by summing a difference between a previously specified time and the third data transmission time and a difference between the previously specified time and the fourth data transmission time.

According to various embodiments of the present disclosure, the synchronization module determines at least one of the third data transmission time and the fourth data transmission time as the fifth data transmission time if the first interval value is less than the second interval value, and determines the previously specified time as the fifth data transmission time if the first interval is equal to or greater than the second interval value.

Figure 7:
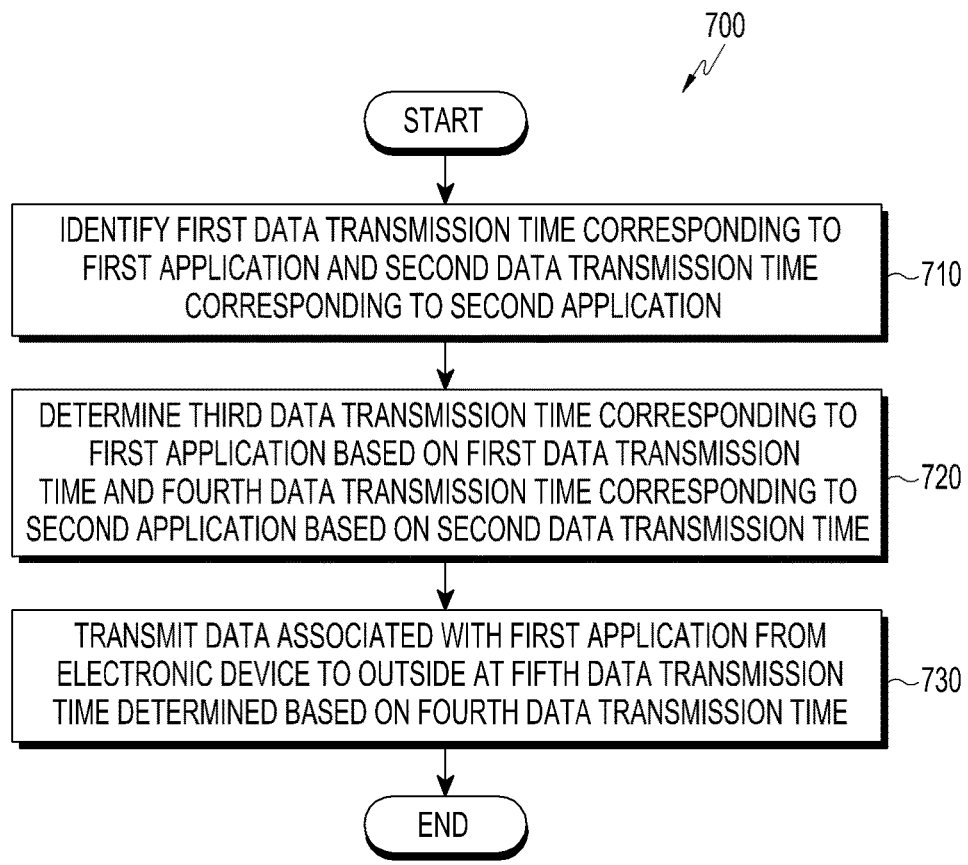
FIG. 7 is a flowchart illustrating exemplary operation of a method for synchronizing message transmission according to various embodiments of the present disclosure.

FIG. 7 is a flowchart of a method for synchronizing message transmission according to various embodiments of the present disclosure. Referring to FIG. 7, in operation 710, the electronic device 101 (for example, the synchronization module 422) identifies a first data transmission time (for example, 00:05) corresponding to a first application (for example, a mail application) and a second data transmission time (for example, 00:08) corresponding to a second application (for example, an SNS application). The first data transmission time or the second data transmission time may be identified based on a time when the first application or the second application has transmitted a message to an external electronic device (for example, the electronic device 102 or 104 or the server 106). The first data transmission time and the second data transmission time may be determined based on at least one of time information specified (for example, previously set) in the electronic device, time information set by an external input (for example, a user input), time information specified in an external electronic device, or time information received from the external electronic device.

According to various embodiments of the present disclosure, when the first data transmission time and the second data transmission time are identified, the identification may be performed based on a specified type of a corresponding one of the first application and the second application. For example, when the first application or the second application transmits a long polling type message to the external device, the first data transmission time or the second data transmission time may be identified. The electronic device may maintain connection from transmission of the long polling type message (for example, a request message) to the external electronic device (for example, the electronic device 102 or 104 or the server 106) until reception of a message (for example, a response message) from the external electronic device. If the response message is received from the external electronic device, the response message is processed. To receive the message from the external electronic device, the electronic device 101 may transmit another message (for example, a request message) to the external electronic device for connection.

In operation 720, the electronic device 101 (for example, the synchronization module 422) determines a third data transmission time corresponding to the first application based on, for example, the first data transmission time, and determines a fourth data transmission time corresponding to the second application based on the second data transmission time. According to an embodiment of the present disclosure, the third data transmission time and the fourth data transmission time may be determined based on one of the first data transmission time and the second data transmission time.

In operation 730, the electronic device 101 (for example, the synchronization module 422) may transmit data associated with the first application to any external device of a plurality of external devices at the fifth data transmission time determined based on at least the fourth data transmission time. According to an embodiment of the present disclosure, the electronic device may transmit data associated with the first application to any external device of the plurality of external devices based on at least one of the third data transmission time and the fourth data transmission time. Alternatively, based on a time specified in the electronic device 101, the electronic device 101 may transmit data associated with the first application. The specified time may be included in a range including the third data transmission time and the fourth data transmission time. Alternatively, the electronic device may transmit the data to the outside based on a time after a predetermined time slot from the time specified in the electronic device 101.

Figure 8:
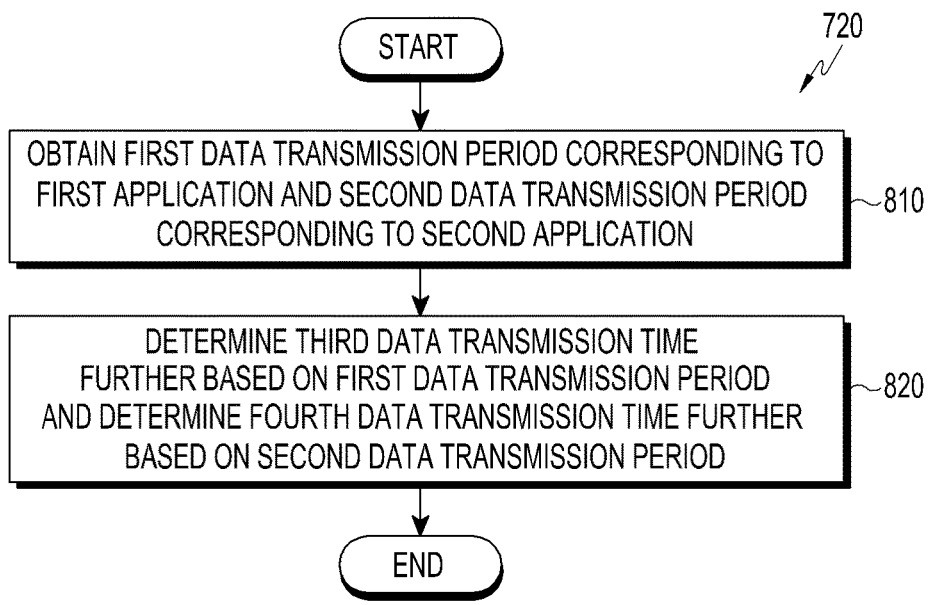
FIG. 8 is a flowchart illustrating exemplary operation of a method for selecting a message transmission time according to various embodiments of the present disclosure.

FIG. 8 is a flowchart of a method for selecting a message transmission time according to various embodiments of the present disclosure. Referring to FIG. 8, the method for selecting a message transmission time according to the current embodiment of the present disclosure may be performed as at least a part of operation 720 of FIG. 7. In operation 810, the electronic device 101 obtains a first data transmission period (or a first data transmission interval) corresponding to the first application and a second data transmission period (or a second data transmission interval) corresponding to the second application. According to an embodiment of the present disclosure, the first data transmission period and the second data transmission period may differ from application to application included in the electronic device 101. The first data transmission period (for example, a first timeout) and the second data transmission period (for example, a second timeout) may correspond to an idle duration in which communication connection between the electronic device 101 and the external device is maintained. If a message is received from the external device before the first data transmission period corresponding to the first application, the first application may deliver an additional message to the outside to maintain communication connection with the external device.

In operation 820, the electronic device 101 determines a third data transmission time further based on the first data transmission period and determines a fourth data transmission time further based on the second data transmission period. According to an embodiment of the present disclosure, the electronic device 101 may determine the third data transmission time based on a sum of the first data transmission time and the first data transmission period. The electronic device 101 may determine the fourth data transmission time based on a sum of the second data transmission time and the second data transmission period.

Figure 9:
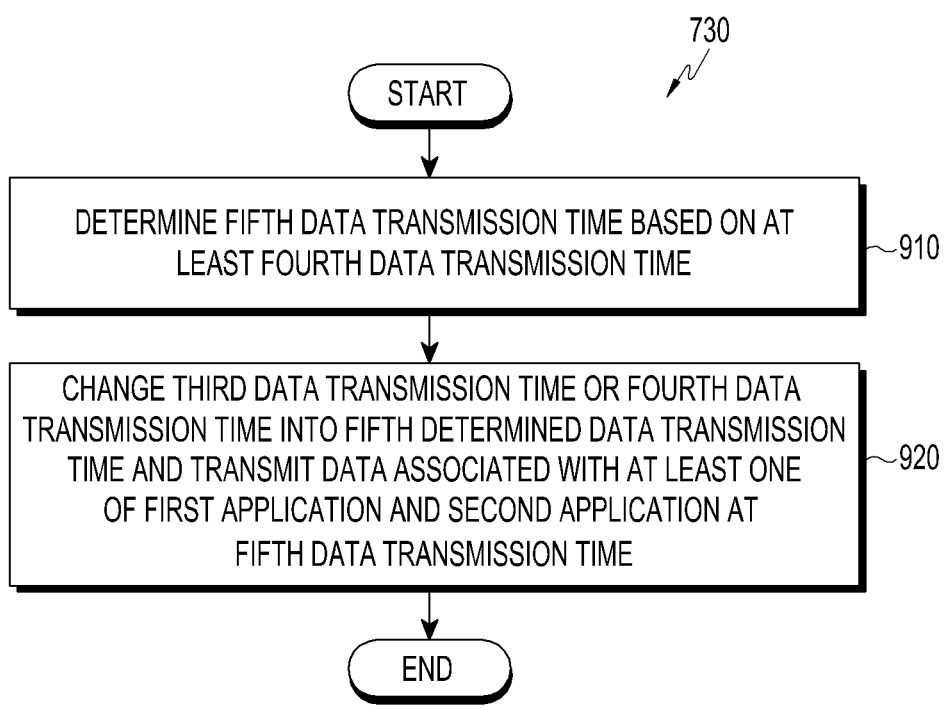
FIG. 9 is a flowchart illustrating exemplary operation of a method for determining a message transmission time according to various embodiments of the present disclosure.

FIG. 9 is a flowchart of a method for determining a message transmission time according to various embodiments of the present disclosure. Referring to FIG. 9, the method for determining a message transmission time according to the current embodiment of the present disclosure may be performed as at least a part of operation 730 of FIG. 7. In operation 910, the electronic device 101 determines a fifth data transmission time based on at least the fourth data transmission time. According to an embodiment of the present disclosure, the electronic device 101 may determine a fifth data transmission time based on the third data transmission time, the fourth data transmission time, a time specified in the electronic device 101, or a time after a predetermined time slot from the time specified in the electronic device 101.

In operation 920, the electronic device 101 changes (or adjusts) at least one of the third data transmission time corresponding to the first application and the fourth data transmission time into the fifth data transmission time, and transmits the data associated with at least one of the first application and the second application to the outside from the electronic device 101 at the fifth data transmission time. According to an embodiment of the present disclosure, if the third data transmission time corresponding to the first application is adjusted to the fourth data transmission time corresponding to the second application, the electronic device 101 may not transmit the data associated with the first application or may deactivate communication connection with the external device, at the third data transmission time.

According to various embodiments of the present disclosure, operation 710 of identifying transmission times of respective applications and operations 720 and 730 of determining data transmission times of the respective applications and transmitting data associated with the respective applications to the outside at the determined data transmission times may be performed in interchangeable orders according to the respective applications, at the same time, or in parallel.

Figure 10:
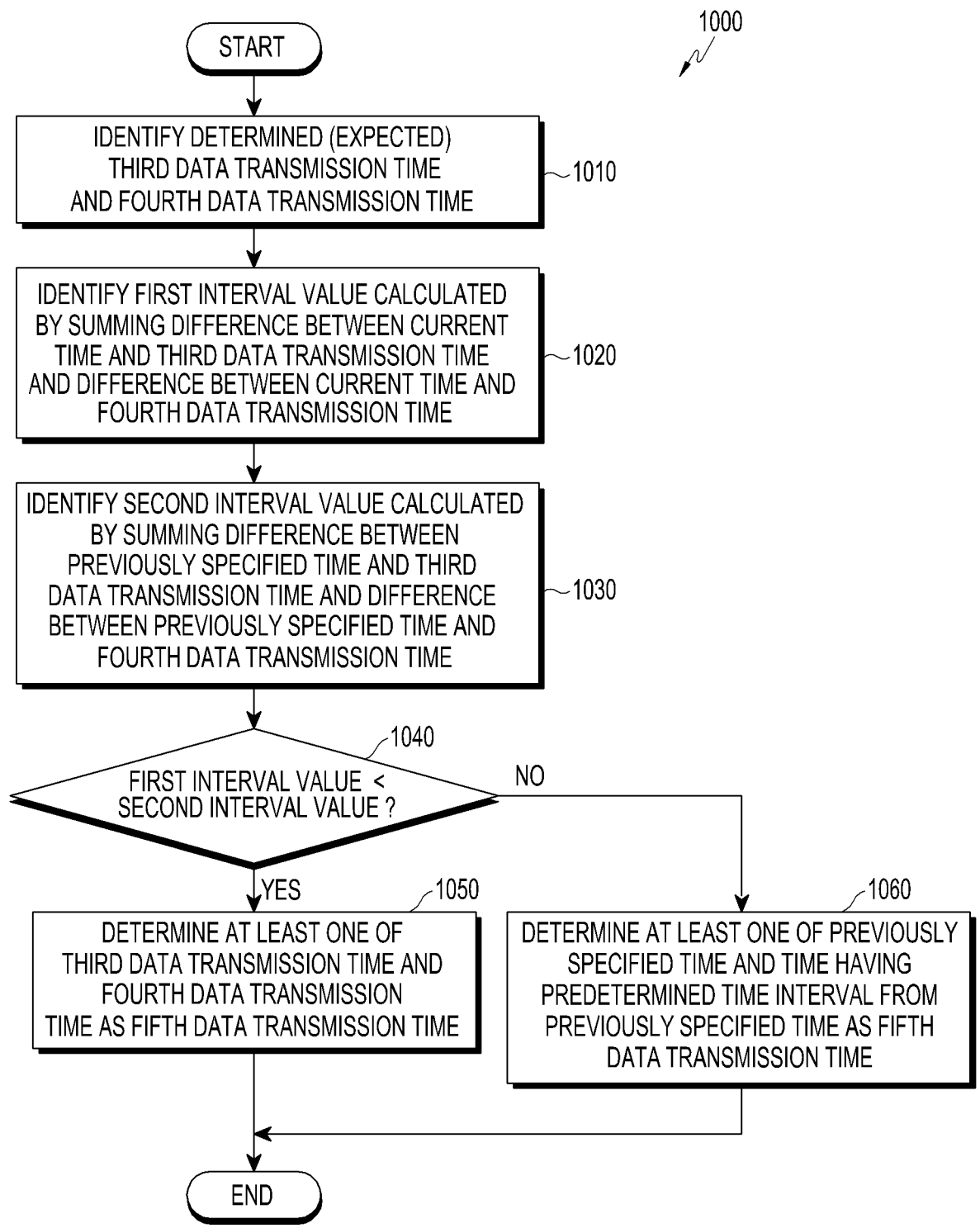
FIG. 10 is a flowchart illustrating exemplary operation of a method for determining a message transmission time among a plurality of message transmission times according to various embodiments of the present disclosure.

FIG. 10 is a flowchart of a method for determining a message transmission time among a plurality of message transmission times according to various embodiments of the present disclosure. Referring to FIG. 10, in operation 1010, an electronic device (for example, the electronic 101) identifies the third data transmission time corresponding to the first application and the fourth data transmission time corresponding to the second application. In operation 1020, the electronic device 101 identifies a first interval value by summing a difference between the current time and the third data transmission time and a difference between the current time and the fourth data transmission time. In operation 1030, the electronic device identifies a second interval value by summing a difference between a previously specified time and the third data transmission time and a difference between the previously specified time and the fourth data transmission time. In operation 1040, the electronic device compares the first interval value with the second interval value. If the first interval value is less than the second interval value in operation 1040, the electronic device determines at least one of the third data transmission time and the fourth data transmission time as a fifth data transmission time in operation 1050. If the first interval value is greater than or equal to the second interval value in operation 1040, the electronic device determines at least one of a previously specified time or a time after a predetermined time slot from the specified time as the fifth data transmission time in operation 1060.

The operations included in the process or method shown in FIGS. 7 through 10 (for example, operations 710 through 730, operations 810 and 820, operations 910 and 920, or operations 1010 through 1060) may be performed in a sequential, parallel, repetitive or heuristic manner. Also, some of the operations may be executed in different order or omitted, or may have additional different operations.

According to various embodiments of the present disclosure, a method includes identifying, at an electronic device, a first data transmission time corresponding to a first application and a second data transmission time corresponding to a second application, determining a third data transmission time corresponding to the first application based on the first data transmission time and a fourth data transmission time corresponding to the second application based on the second data transmission time, and transmitting data associated with the first application to an outside of the electronic device at a fifth data transmission time determined based on at least the fourth data transmission time.

According to various embodiments of the present disclosure, the third data transmission time is determined further based on a first data transmission period corresponding to the first application, and the fourth data transmission time is determined further based on a second data transmission period corresponding to the second application.

According to various embodiments of the present disclosure, each of the first data transmission period and the second data transmission period corresponds to an idle duration that is set at a corresponding one of the first data transmission time and the second data transmission time in which communication connection between the electronic device and an external device is maintained.

According to various embodiments of the present disclosure, the identifying of the first data transmission time or the second data transmission time includes determining whether a corresponding one of the first application and the second application uses communication connection of a specified type.

According to various embodiments of the present disclosure, the specified type includes a long polling type.

According to various embodiments of the present disclosure, the fifth data transmission time is different from the fourth data transmission time.

According to various embodiments of the present disclosure, the transmitting of the data includes avoiding transmitting data associated with the first application at the third data transmission time.

According to various embodiments of the present disclosure, the transmitting of the data includes adjusting the third data transmission time based on at least the fourth data transmission time.

According to various embodiments of the present disclosure, the transmitting of the data includes deactivating communication connection with the external device in association with the data at the third data transmission time.

The apparatuses and methods of the disclosure can be implemented in hardware, and in part as firmware or as machine executable computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive machine executable code or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se.

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. In addition, the controllers shown herein are hardware that are comprised of components, for example, a processor or microprocessor configured for operation by the algorithms shown in the flowcharts and described herein.

A term "module may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

According to various embodiments of the present disclosure, some devices (for example, modules or functions thereof) or methods (for example, operations) may be implemented with instructions stored in a computer-readable storage medium in a programming module type. When the instructions are executed by one or more processors (for example, the processor 120), the one or more processors may perform functions corresponding to the instructions. The computer-readable storage medium may be, for example, the memory 130.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. Random Access Memory (RAM), flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

According to various embodiments of the present disclosure, in a storage medium having stored therein commands, the commands are configured to cause at least one processors to execute at least one operations when the commands are executed by the at least one processors and the at least one operations may include identifying, at an electronic device, a first data transmission time corresponding to a first application and a second data transmission time corresponding to a second application, determining a third data transmission time corresponding to the first application based on the first data transmission time and a fourth data transmission time corresponding to the second application based on the second data transmission time, and transmitting data associated with the first application to an outside of the electronic device at a fifth data transmission time determined based on at least the fourth data transmission time.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

An electronic device and method according to various embodiments obtain an operating period (or an operating interval) of the electronic device by using information for communication connection between, for example, a plurality of electronic devices, and synchronize the electronic device by using the obtained operating period, thus reducing power consumption and improving the use of the electronic device.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

The embodiments of the present disclosure provided in the present specification and the drawings merely provide particular examples to easily describe the technical contents of the present disclosure and to facilitate understanding of the present disclosure, rather than to limit the scope of the embodiments of the present disclosure. Thus, the scope of the embodiments of the present disclosure should be construed as including any changes or modifications derived from the technical spirit of the embodiments of the present disclosure as well as the embodiments described herein.

What is claimed is:

1. A method comprising:
    identifying a first time, by an electronic device, as a first data transmission time that corresponds to a first application;
    identifying a second time by the electronic device as a second data transmission time that corresponds to a second application;
    determining a third data transmission time that corresponds to the first application based on the first data transmission time and a fourth data transmission time that corresponds to the second application based on the second data transmission time;
    transmitting data associated with the first application at a fifth data transmission time determined based on at least the fourth data transmission time, wherein the fifth data transmission time is determined to be a transmission time between the third data transmission time and the fourth data transmission time that is closer to a current time;
    determining a sixth data transmission time that corresponds to the first application based on the third data transmission time and a seventh data transmission time that corresponds to the second application based on the fourth data transmission time; and
    when a difference between the fifth data transmission time and the sixth data transmission time is less than a difference between the fifth data transmission time and the seventh data transmission time, transmitting data associated with the first application at the seventh data transmission time.

2. The method of claim 1, wherein the third data transmission time is additionally based on a first data transmission period corresponding to the first application, and the fourth data transmission time is additionally based on a second data transmission period corresponding to the second application.

3. The method of claim 2, wherein each of the first data transmission period and the second data transmission period respectively corresponds to an idle duration time that is set at a corresponding one of the first data transmission time and the second data transmission time in which a communication connection between the electronic device and an external device is maintained.

4. The method of claim 1, wherein the identifying of the first data transmission time or the second data transmission time comprises determining whether a corresponding one of the first application and the second application utilizes a specific type of communication connection.

5. The method of claim 4, wherein the specific type of communication comprises a long polling type.

6. The method of claim 1, wherein the fifth data transmission time is different from the fourth data transmission time.

7. The method of claim 1, wherein the transmitting of the data associated with the first application at the fifth data transmission time does not occur during the third data transmission time.

8. The method of claim 1, wherein the transmitting of the data associated with the first application at the fifth data transmission time comprises adjusting the third data transmission time based on at least the fourth data transmission time.

9. The method of claim 1, wherein the transmitting of the data comprises deactivating a communication connection with any external device in association with the data at the third data transmission time.

10. An electronic device comprising:
    a communication module configured to communicatively couple the electronic device with an external device; and
    a synchronization module executed by a processor,
    wherein the synchronization module is configured to:
        identify a first data transmission time that corresponds to a first application and a second data transmission time that corresponds to a second application;
        determine a third data transmission time that corresponds to the first application based on the first data transmission time and a fourth data transmission time that corresponds to the second application based on the second data transmission time;
        transmit data associated with the first application to external device at a fifth data transmission time determined based on at least the fourth data transmission time through the communication module, wherein the fifth data transmission time is determined to be a transmission time between the third data transmission time and the fourth data transmission time that is closer to a current time,
        determine a sixth data transmission time that corresponds to the first application based on the third data transmission time and a seventh data transmission time that corresponds to the second application based on the fourth data transmission time; and
        when a difference between the fifth data transmission time and the sixth data transmission time is less than a difference between the fifth data transmission time and the seventh data transmission time, transmit data associated with the first application at the seventh data transmission time through the communication module.

11. The electronic device of claim 10, wherein the third data transmission time is additionally based on a first data transmission period that corresponds to the first application, and the fourth data transmission time is additionally based on a second data transmission period that corresponds to the second application.

12. The electronic device of claim 10, wherein the synchronization module determines the fifth data transmission time based on a time previously specified in the electronic device.

13. The electronic device of claim 12, wherein the synchronization module is configured to set, as the specified time, a time that is included in a specified range including the third data transmission time and the fourth data transmission time and is a different time than the third data transmission time or the fourth data transmission time.

14. The electronic device of claim 10, wherein the synchronization module is configured to select the fifth data transmission time from a duration time other than a duration time in which a communication connection between the electronic device and the external device is deactivated.

15. The electronic device of claim 10, wherein the synchronization module is additionally configured to determine the fifth data transmission time based on at least one of an amount of power consumption associated with the first application or the second application, and a remaining amount of power associated with the electronic device.

16. The electronic device of claim 10, wherein the synchronization module is configured to derive the fifth data transmission time based on at least one of the third data transmission time, the fourth data transmission time, and a previously-specified time and to change at least one of the third data transmission time and the fourth data transmission time to the fifth data transmission time.

17. The electronic device of claim 10, wherein the synchronization module is configured to calculate an eighth data transmission time corresponding to a third application when data transmission is recognized in the third application, and to change the fifth data transmission time further based on the eighth data transmission time.

18. The electronic device of claim 10, wherein the synchronization module is configured to determine the fifth data transmission time based on at least one of a first interval value calculated by summing a difference between a current time and the third data transmission time and a difference between the current time and the fourth data transmission time and a second interval value calculated by summing a difference between a previously-specified time and the third data transmission time and a difference between the previously-specified time and the fourth data transmission time.

19. A computer-readable recording medium having recorded thereon a program for executing operations of:
identifying, at an electronic device, a first data transmission time that corresponds to a first application;
identifying, at the electronic device, a second data transmission time that corresponds to a second application;
determining a third data transmission time that corresponds to the first application based on the first data transmission time and a fourth data transmission time that corresponds to the second application based on the second data transmission time;
transmitting data associated with the first application to an external electronic device at a fifth data transmission time determined based on at least the fourth data transmission time, wherein the fifth data transmission time is determined to be a transmission time between the third data transmission time and the fourth data transmission time that is closer to a current time;
determining a sixth data transmission time that corresponds to the first application based on the third data transmission time and a seventh data transmission time that corresponds to the second application based on the fourth data transmission time; and
when a difference between the fifth data transmission time and the sixth data transmission time is less than a difference between the fifth data transmission time and the seventh data transmission time, transmitting data associated with the first application at the seventh data transmission time.

* * * * *